US012275099B2

(12) United States Patent
Tanaka et al.

(10) Patent No.: US 12,275,099 B2
(45) Date of Patent: Apr. 15, 2025

(54) WELDING CONTROL DEVICE, DISPLAY CONTROL DEVICE, WELDING SYSTEM, WELDING CONTROL METHOD, AND PROGRAM

(71) Applicant: Kobe Steel, Ltd., Kobe (JP)

(72) Inventors: Nobuaki Tanaka, Fujisawa (JP); Akira Okamoto, Kobe (JP)

(73) Assignee: Kabushiki Kaisha Kobe Seiko Sho (Kobe Steel, Ltd.), Kobe (JP)

(*) Notice: Subject to any disclaimer, the term of this patent is extended or adjusted under 35 U.S.C. 154(b) by 1104 days.

(21) Appl. No.: 17/266,861

(22) PCT Filed: Aug. 7, 2019

(86) PCT No.: PCT/JP2019/031251
§ 371 (c)(1),
(2) Date: Feb. 8, 2021

(87) PCT Pub. No.: WO2020/039948
PCT Pub. Date: Feb. 27, 2020

(65) Prior Publication Data
US 2021/0291288 A1   Sep. 23, 2021

(30) Foreign Application Priority Data
Aug. 21, 2018   (JP) .................. 2018-154606

(51) Int. Cl.
*B23K 9/095*   (2006.01)
*B23K 9/10*    (2006.01)

(52) U.S. Cl.
CPC .............. *B23K 9/095* (2013.01); *B23K 9/10* (2013.01)

(58) Field of Classification Search
None
See application file for complete search history.

(56) References Cited

U.S. PATENT DOCUMENTS

2006/0201915 A1* 9/2006 Obana ................. B23K 9/0213
219/76.1
2016/0193681 A1* 7/2016 Pesme ................. B23K 9/1274
219/136

FOREIGN PATENT DOCUMENTS

BR   102015030119 A2 *  6/2017 ............ B23K 3/047
JP       2-20661 A         1/1990
(Continued)

OTHER PUBLICATIONS

Machine translation JP-2006-2821282-A (Year: 2024).*
(Continued)

*Primary Examiner* — Geoffrey S Evans
(74) *Attorney, Agent, or Firm* — Oblon, McClelland, Maier & Neustadt, L.L.P.

(57) ABSTRACT

This welding control device which controls a welding condition when arc welding is performed on a groove having a root gap, comprises: a first detection means for detecting, from a captured image of a fused section formed in the groove, the position of the tip of the fused section with respect to a direction in which the welding progresses; a second detection means for detecting the position of an end of a to-be-welded object for defining the root gap; a determination means for determining the relationship between the position of the end and the position of the tip of the fused section; and a control means for controlling the welding condition according to the determination result.

15 Claims, 19 Drawing Sheets

(56) References Cited

FOREIGN PATENT DOCUMENTS

| | | | | |
|---|---|---|---|---|
| JP | 05111767 | A | * | 5/1993 |
| JP | 2006281282 | A | * | 10/2006 |
| JP | 2008-246536 | A | | 10/2008 |
| JP | 2015-98031 | A | | 5/2015 |
| JP | 2015098031 | A | * | 5/2015 |

OTHER PUBLICATIONS

Machine translation of JP-2015098031-A, Jul. 2024 (Year: 2024).*
Machine translation of BR-102015030119-A2, Jul. 2024 (Year: 2024).*
Machine translation of JP-05111767-A, Jul. 2024 (Year: 2024).*
International Search Report issued Nov. 5, 2019 in PCT/JP2019/031251 filed Aug. 7, 2019, 2 pages.

* cited by examiner

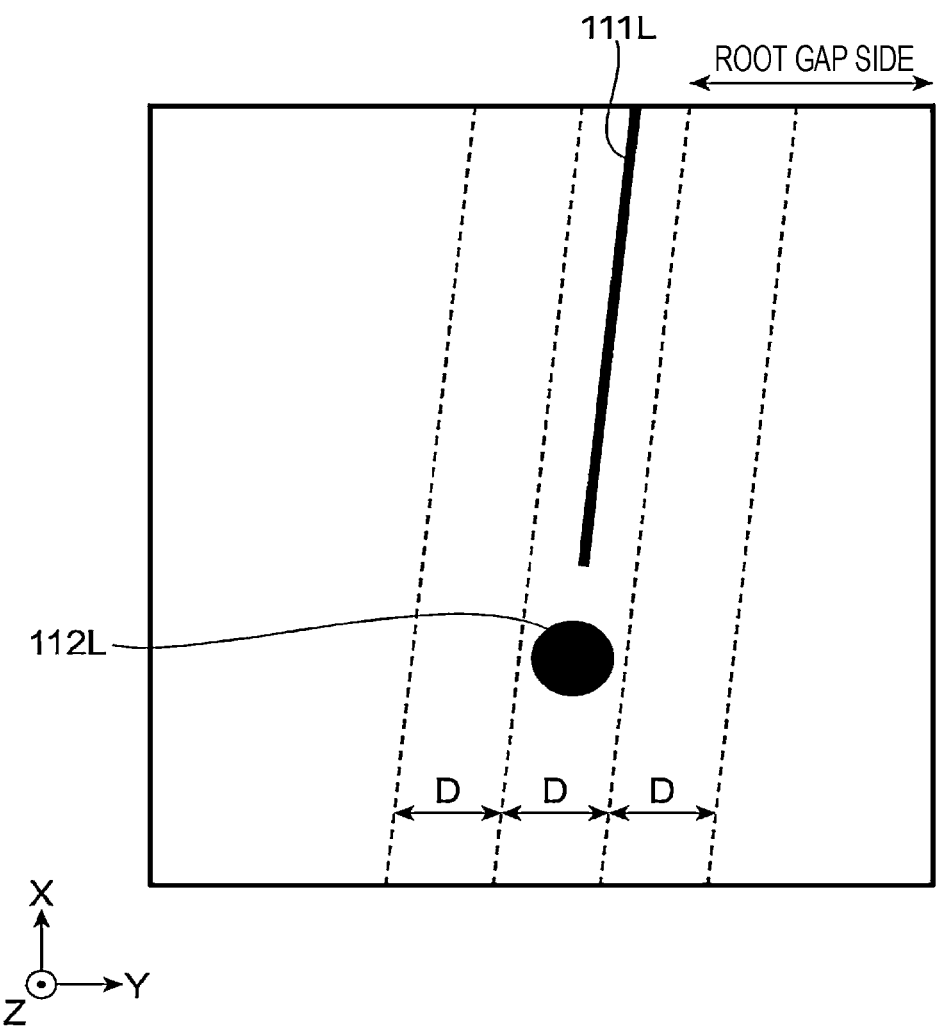

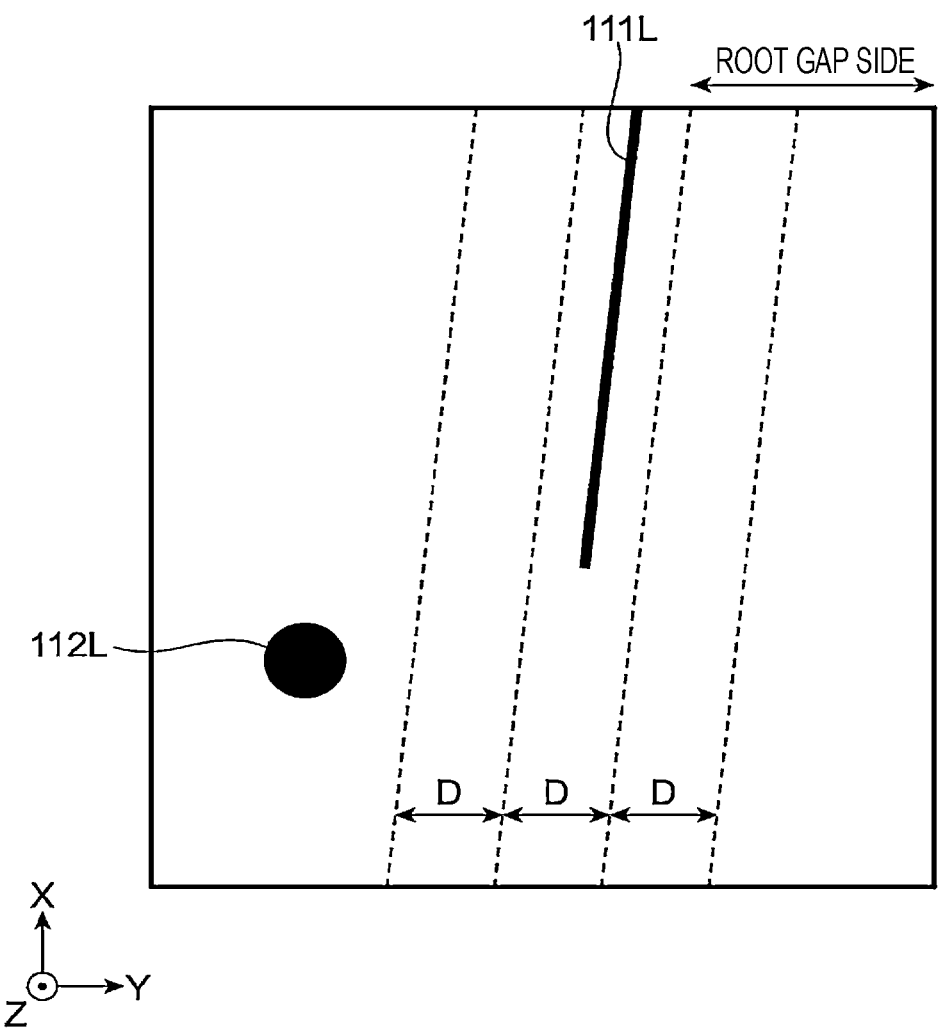

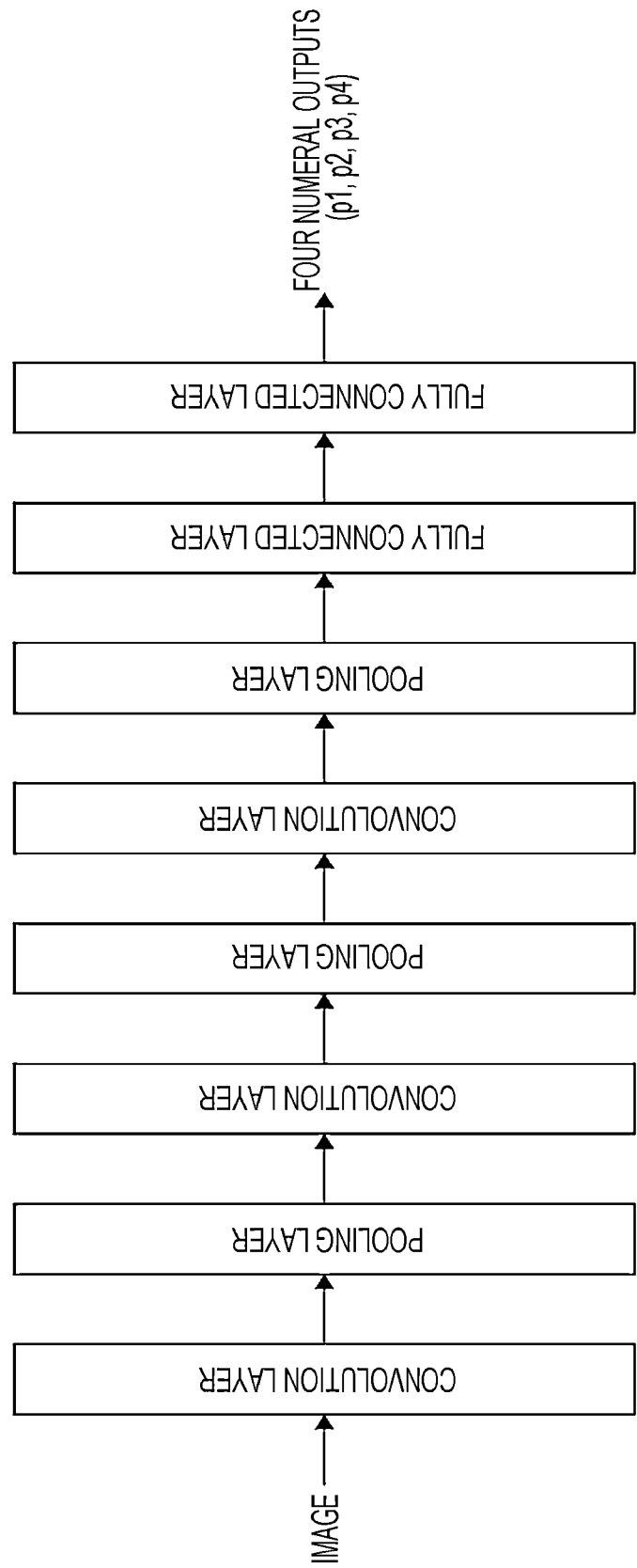

WELDING CONTROL DEVICE, DISPLAY CONTROL DEVICE, WELDING SYSTEM, WELDING CONTROL METHOD, AND PROGRAM

TECHNICAL FIELD

The present invention relates to a welding control device, a display control device, a welding system, a welding control method, and a program.

BACKGROUND ART

Recently, automation has been promoted in welding steps carried out in a variety of industries. In arm welding for a groove having a root gap, however, automation has been considered difficult due to factors including not only a gap width, misalignment, and a change in shape of a workpiece caused by thermal deformation, but also disturbances such as a shield gas failure and magnetic are blow.

To cope with the above-mentioned problem, visual sensing using a laser sensor or a visual sensor has been used so far.

For example, Patent Literature (PTL) 1 discloses the following matters. An image of a molten pool of materials to be welded and the vicinity thereof is captured by a visual sensor, and a contour of the molten pool is extracted from the captured image. A left end point given as a tip point of the molten pool on the left side and a right end point given as a tip point thereof on the right side are extracted from the extracted contour. A width of a tip portion of the molten pool is calculated from coordinates of the extracted left end point and the extracted right end point. A change amount of a root gap is calculated from the calculated width of the tip portion of the molten pool. A control amount of a torch weaving width and a control amount of a welding speed are calculated based on the calculated change amount of the root gap. The torch weaving width and the welding speed are controlled in accordance with the control amounts of the torch weaving width and the welding speed. PTL 1 further states that, even when the root gap is changed, a satisfactory shape of a penetration bead and satisfactory bead quality can be stably obtained with the disclosed control method regardless of TIG (Tungston Inert Gas) welding or GMA (Gas Metal Arc) welding.

Furthermore, PTL 2 discloses a welding method and a welding apparatus in which the following steps are carried out. A step of placing a plurality of to-be-welded materials in contact with each other while a groove is defined by welded portions of the to-be-welded materials. A step of placing an electrode and a filler close to the welded portions of the plurality of to-be-welded materials and melting the filler near the welded portions. A step of capturing an image of a subject including a molten pool, the electrode, and the filler with first image capturing means on a side where the groove is defined by the plurality of to-be-welded materials, performing image processing on the captured image, and extracting first information. A step of capturing an image of a subject including a penetration bead and a red-hot portion with second image capturing means on an opposite side to the side where the groove is defined by the plurality of to-be-welded materials, performing image processing on the captured image, and extracting second information. A step of controlling a welding condition based on the first information and the second information. PTL 2 further states that the penetration bead can be reliably formed by performing the above-mentioned steps.

CITATION LIST

Patent Literature

PTL 1: Japanese Unexamined Patent Application Publication No. 2006-281282
PTL 2: Japanese Unexamined Patent Application Publication No. 2015-98031

SUMMARY OF INVENTION

Technical Problem

According to the method disclosed in PTL 1, the width of the tip portion of the molten pool is calculated by extracting the left end point and the right end point at the tip of the molten pool from the image that has been captured by the visual sensor. Then, the weaving width and the welding speed are controlled based on only the change of the root gap, which has been obtained by subtracting an ideal width from the calculated width. However, the left end point and the right end point at the tip of the molten pool changes from moment to moment due to the disturbances such as the magnetic are blow, an arc voltage, physical properties of the molten pool, and so on, the width of the tip portion of the molten pool does not always simply increases as the root gap increases. Moreover, in order to accurately determine the suitability of the penetration bead and control the welding condition, it is required not only to obtain the change amount of the root gap, but also to determine whether the penetration bead is suitable for the root gap at the present time.

According to the method disclosed in PTL 2, the image of the subject including the molten pool and so on is captured with the first imago capturing means disposed on the side where the groove is defined by the to-be-welded materials, while the image of the subject including the penetration bead and the red-hot portion is captured with the second image capturing means disposed on the opposite side to the above-mentioned side. Then, the welding condition is controlled by utilizing the obtained image information. However, the method of capturing the image of the subject including the penetration bead and the red-hot portion with the second image capturing means and determining whether the penetration bead at the root gap is suitable needs the second image capturing means to be disposed on the opposite to the side where the groove is defined by the to-be-welded materials, and makes the welding apparatus more complicated. Hence, the disclosed method cannot be said as being universal.

An object of the present invention is to ensure that the satisfactory penetration bead can be obtained even with the occurrence of the misalignment of the root gap, the change in shape of the workpiece caused by, for example, thermal deformation, and the disturbances such as the magnetic are blow.

Solution to Problem

The present invention provides a welding control device for controlling a welding condition when arc welding is performed on a groove having a root gap, the welding control device including first detection means that detects, from a captured image of a fusion zone formed in the groove, a position of a tip of the fusion zone with respect to a direction in which the arc welding progresses, second detection means that detects a position of an end of a to-be-welded object, the end defining the root gap, determination means that determines a relation between the position of the end and the position of the tip of the fusion zone, and control means that controls the welding condition in accordance with a determination result of the determination means.

In the above welding control device, the second detection means may detect, from the captured image of the fusion zone, the position of the end of the to-be-welded object, the end defining the root gap. On that occasion, the position of the tip of the fusion zone and the position of the end of the to-be-welded object, the end defining the root gap, may be given based on a reference point that is set on the image in advance.

The welding condition may be one or more among a welding current, an arc voltage, a welding speed, a wire feed speed, an electrode position, a wire insertion position, and a weaving condition.

The determination means may determine, with respect to a width direction of the groove perpendicular to both the direction in which the arc welding progresses and a thickness direction of the to-be-welded object in a surface of the to-be-welded object, both or either one of a positional relation between the end of the to-be-welded object positioned on one side and the tip of the fusion zone positioned on the one side, and a positional relation between the end of the to-be-welded object positioned on the other side opposite to the one side and the tip of the fusion zone positioned on the other side. Stated in another way, the determination means may determine both or either one of a positional relation of the tip of the fusion zone positioned on a left side relative to the end of the to-be-welded object positioned on the left side with respect to the direction in which the arc welding progresses, and a positional relation of the tip of the fusion zone positioned on a right side relative to the end of the to-be-welded object positioned on the right side with respect to the direction in which the arc welding progresses.

The determination means may determine both or either one of that, with respect to the width direction of the groove, the tip of the fusion zone positioned on the one side is located within a vicinity range relative to the end of the to-be-welded object positioned on the one side, or located away beyond the vicinity range toward the one side, or located away beyond the vicinity range toward the other side, and that, with respect to the width direction of the groove, the tip of the fusion zone positioned on the other side is located within a vicinity range relative to the end of the to-be-welded object positioned on the other side, or located away beyond the vicinity range toward the other side, or located away beyond the vicinity range toward the one side. Stated in another way, the determination means may determine both or either one of that the tip of the fusion zone positioned on a left side with respect to the direction in which the arc welding progresses is located within a vicinity range relative to the end of the to-be-welded object positioned on the left side with respect to the direction in which the arc welding progresses, or located away beyond the vicinity range toward the left side, or located away beyond the vicinity range toward a right side, and that the tip of the fusion zone positioned on the right side with respect to the direction in which the arc welding progresses is located within a vicinity range relative to the end of the to-be-welded object positioned on the right side with respect to the direction in which the arc welding progresses, or located away beyond the vicinity range toward the right side, or located away beyond the vicinity range toward the left side.

The control means may decide a correction amount of the welding condition in accordance with both or either one of, with respect to a width direction of the groove perpendicular to both the direction in which the arc welding progresses and a thickness direction of the to-be-welded object in a surface of the to-be-welded object, a distance between the end of the to-be-welded object positioned on one side and the tip of the fusion zone positioned on the one side, and a distance between the end of the to-be-welded object positioned on the other side opposite to the one side and the tip of the fusion zone positioned on the other side. Stated in another way, the control means may decide a correction amount of the welding condition in accordance with both or either one of a distance between the end of the to-be-welded object positioned on a left side with respect to the direction in which the arc welding progresses and the tip of the fusion zone positioned on the left side, and a distance between the end of the to-be-welded object positioned on a right side with respect to the direction in which the arc welding progresses and the tip of the fusion zone positioned on the right side.

The control means may control the welding condition based on a model that has been prepared through learning of a relation between the determination result and the welding condition.

The first detection means may detect, based on a first model that has been prepared through learning of a relation between the captured image of the fusion zone and the position of the tip of the fusion zone, the position of the tip from the captured image that is newly given, and the second detection means may detect, based on a second model that has been prepared through learning of a relation between the captured image and the position of the end of the to-be-welded object, the end defining the root gap, the position of the end from the captured image that is newly given.

An amount of transmitted light per unit time or a wavelength band in capturing the image of the fusion zone may be changed depending on a welding current.

The welding control device may further include display control means that displays, in a superimposed relation to the captured image of the fusion zone, a symbol indicating a position at which the tip of the fusion zone has been detected and a straight line indicating a position at which the end defining the root gap has been detected. The symbol may be displayed at the detected position each time the tip of the fusion zone is newly detected.

The welding control device may further include display control means that displays a result of evaluating, based on a predetermined reference, the relation between the position of the end and the position of the tip of the fusion zone on a time series basis in correspondence to the end.

Furthermore, the present invention provides a display control device for displaying, on a display unit, an image of a fusion zone captured during arc welding performed on a groove having a root gap, the fusion zone being formed in the groove, wherein the display control device includes a display control unit that displays, in a superimposed relation to the image, a symbol indicating a position of a tip of the fusion zone with respect to a direction in which the arc welding progresses, and a straight line indicating a position of an end of a to-be-welded object, the end defining the root gap, the symbol and the straight line being detected from the image.

Moreover, the present invention provides a welding system including a welding apparatus that performs arc welding on a to-be-welded object, a visual sensor mounted at a position at which the visual sensor is able to capture an image of a fusion zone formed in a groove having a root gap, and a welding control device that controls a welding condition specifying a motion of the welding apparatus, wherein the welding control device includes first detection means that detects, from the image captured by the visual sensor, a position of a tip of the fusion zone with respect to a direction in which the arc welding progresses, second detection means that detects a position of an end of the to-be-welded object, the end defining the root gap, determination means that determines a relation between the position of the end and the position of the tip of the fusion zone, and control means that controls the welding condition in accordance with a determination result of the determination means.

Still further, the present invention provides a welding control method for controlling a welding condition when arc welding is performed on a groove having a root gap, the welding control method including steps of detecting, from a captured image of a fusion zone formed in the groove, a position of a tip of the fusion zone with respect to a direction in which the arc welding progresses, detecting a position of an end of a to-be-welded object, the end defining the root gap, determining a relation between the position of the end and the position of the tip of the fusion zone, and controlling the welding condition in accordance with a determination result.

In addition, the present invention provides a program used in a welding control device for controlling a welding condition when arc welding is performed on a groove having a root gap, the program causing the welding control device to implement functions of detecting, from a captured image of a fusion zone formed in the groove, a position of a tip of the fusion zone with respect to a direction in which the arc welding progresses, detecting a position of an end of a to-be-welded object, the end defining the root gap, determining a relation between the position of the end and the position of the tip of the fusion zone, and controlling the welding condition in accordance with a determination result.

Advantageous Effects of Invention

According to the present invention, a satisfactory penetration bead can be obtained even with the occurrence of misalignment of the root gap, a change in shape of a workpiece caused by, for example, thermal deformation, and disturbances such as magnetic arc blow.

BRIEF DESCRIPTION OF DRAWINGS

FIG. 5A is an explanatory view representing the case in which a fusion amount of a filler wire is suitable.

FIG. 5B is an explanatory view representing the case in which the fusion of the filler wire is unsuitable.

FIG. 15 is an explanatory view representing processing steps, executed by the determination unit, from a step of applying the image input from the visual sensor to a learning model to a step of outputting any one of four types of determination results.

DESCRIPTION OF EMBODIMENTS

An embodiment of the present invention will be described below.

This embodiment is described in connection with a TIG welding system that is an example of a welding system using a non-consumable electrode. In the following, the TIG welding system is simply called a welding system 1.

It is to be noted that the present invention is not limited to the configuration described in this embodiment. For example, the present invention can be further applied to a MAG (Metal Active Gas) welding system that is an example of a welding system using a consumable electrode.

<Overall Configuration of Welding System>

Figure 1:
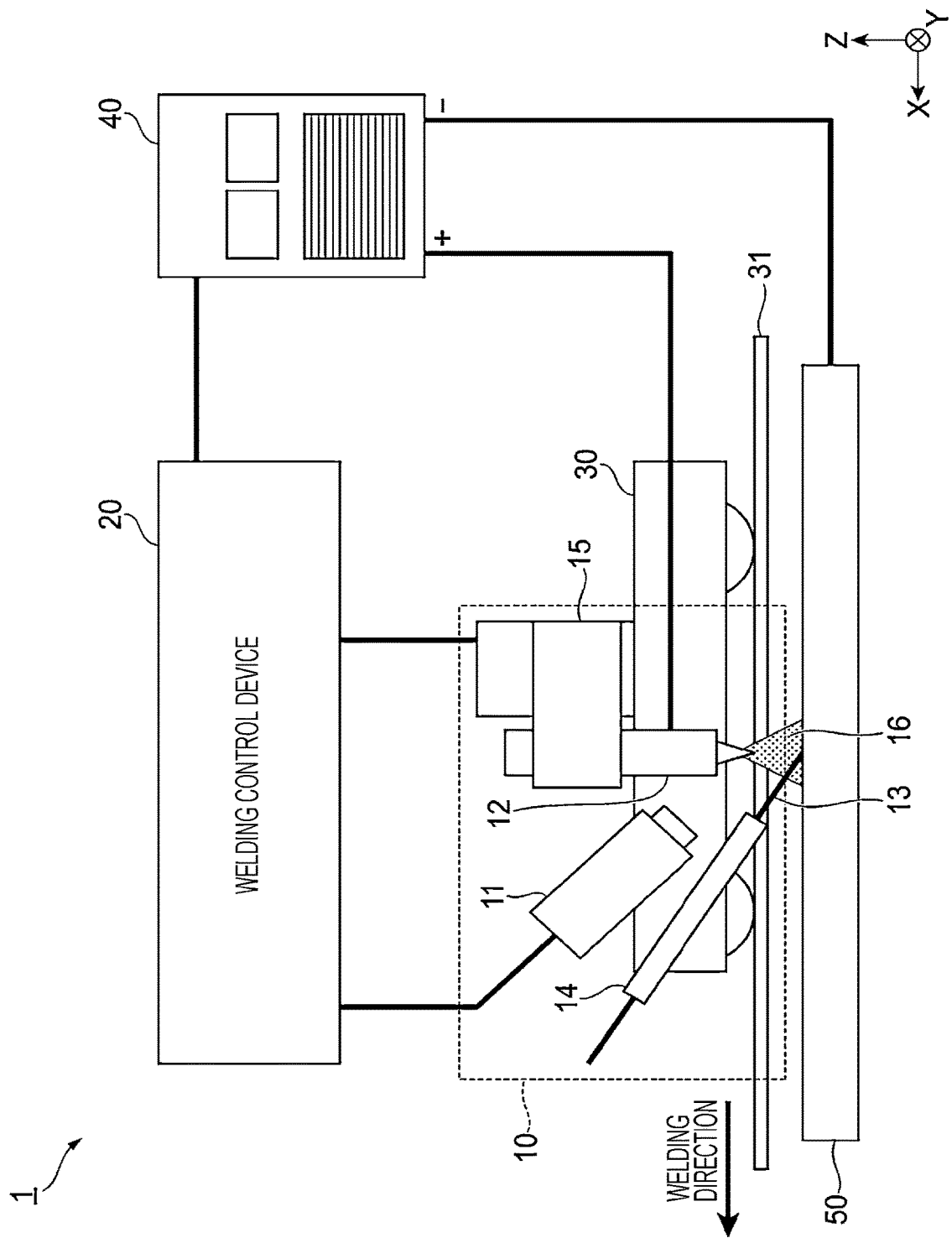
FIG. 1 is an overall schematic view illustrating an example of configuration of a welding system according to an embodiment.

FIG. 1 is an overall schematic view illustrating an example of configuration of the welding system 1 according to the embodiment.

The welding system 1 includes a welding apparatus 10 that performs arc welding on materials to be welded, and a welding control device 20 that controls one or more welding conditions specifying motion of the welding apparatus 10. The to-be-welded materials are an example of objects to be welded. The welding apparatus 10 illustrated in FIG. 1 includes a visual sensor 11 disposed on a front side in a direction in which welding progresses with respect to a welding region, a welding torch 12 including a TIG electrode, a wire reel (not illustrated) for a filler wire 13, a feeder (not illustrated) that feeds the filler wire 13, and a conduit cable 14 that supports the filler wire 13. In the following description, the direction in which the welding progresses is called the "welding direction", and the front side in the direction in which the welding progresses is called the "front side in the welding direction".

The welding apparatus 10 is mounted to a carriage 30 in the form of a dolly and is moved along a rail 31 together with the carriage 30. In the case of FIG. 1, the rail 31 is installed parallel to the welding direction. In the welding apparatus 10 according to this embodiment, a pair of to-be-welded materials 50 defining a groove in the region where arc welding is performed are disposed with a root gap (not illustrated) interposed therebetween. In the case of FIG. 1, one of the pair of to-be-welded materials 50 is disposed adjacent to the other on a backside of the drawing sheet in a Y-axis direction. The root gap implies a gap formed between the pair of to-be-welded materials. In the case of FIG. 1, the welding direction is an X-axis direction. In this embodiment, the region where arc welding is performed is also called a welding line. A direction in which the welding line extends in this embodiment is parallel to an X-axis. A Z-axis corresponds to an up-down direction.

The welding control device 20 in this embodiment processes an image captured by the visual sensor 11 and controls the welding condition of the welding apparatus 10. This embodiment includes one visual sensor 11 and does not use a visual sensor for capturing an image of a penetration bead. The welding control device 20 in this embodiment is constituted as a computer executing programs. In addition, the welding system 1 includes a welding power supply 40 that applies a voltage for generating an arc 16 to the electrode, and a cooling water circulator (not illustrated) that circulates cooling water within the welding apparatus 10. The welding system 1 may further include a teaching unit 17, illustrated in FIG. 3, with which, for example, the welding conditions can be input and manual operations of various drive units constituting the welding apparatus can be performed. The teaching unit 17 may be disposed inside the welding apparatus 10 or outside the welding apparatus 10. In an example, the teaching unit 17 may be disposed on the carriage 30.

<Configuration of Welding Apparatus 10>

The welding apparatus 10 illustrated in FIG. 1 includes the welding torch 12 that holds the TIG electrode, and the conduit cable 14 that supports the filler wire 13.

Here, a width direction of the groove, which is perpendicular to the welding line parallel to the X-axis and which is parallel to surfaces of the to-be-welded materials, is also called a left-right direction. The left-right direction corresponds to the Y-axis direction.

The welding torch 12 is supported by a 2-axis slider 15 causing the welding torch 12 to slide in the Y-axis direction perpendicular to the welding line that is parallel to the X-axis, and in a Z-axis direction vertical to a plane that is defined by the X-axis and the V-axis. The welding apparatus 10 further includes the wire reel (not illustrated) that supplies the filler wire 13 to the to-be-welded materials 50.

<Configuration of Welding Torch 12>

The welding torch 12 includes the TIG electrode. The welding torch 12 generates the arc 16 when the voltage is applied to the TIG electrode from the welding power supply 40.

Although one welding torch 12 is mounted to one carriage 30 in the example of FIG. 1, a plurality of welding torches 12 may be mounted to one carriage 30. The 2-axis slider 15 supports the welding torch 12. The 2-axis slider 15 includes a horizontal slide unit that slides the welding torch 12 in the Y-axis direction, and a vertical slide unit that slides the welding torch 12 in the Z-axis direction. The Y-axis direction coincides with the width direction of the groove, which is parallel to a workpiece surface. The horizontal slide unit slides the welding torch 12 in an oscillating manner. The Z-axis direction coincides with a thickness direction of the to-be-welded materials 50. The horizontal slide unit and the vertical slide unit include power transmission mechanisms for transmitting motive power of a motor (not illustrated) and so on such that they can not only automatically slide the TIG electrode in the Y-axis direction and the Z-axis direction, respectively, but also cause the TIG electrode to perform a weaving operation in the middle of the welding. In the case of using the plurality of welding torches 12, a distance between one welding torch 12 and the adjacent welding torch 12, namely, a pole-to-pole distance, is preferably 50 to 400 mm. By setting the pole-to-pole distance to be 50 mm or longer, heat input can be suppressed more reliably. By setting the pole-to-pole distance to be 400 mm or shorter, a more satisfactory appearance of the penetration bead is obtained, and control of the welding conditions becomes easier to perform.

<Configurations of Carriage 30 and Rail 31>

As illustrated in FIG. 1, the carriage 30 runs in the X-axis direction along the rail 31, namely parallel to a direction of the welding line. With running of the carriage 30, the entirety of the welding apparatus 10 is moved in the X-axis direction.

<Configuration of Visual Sensor 11>

Figure 2:
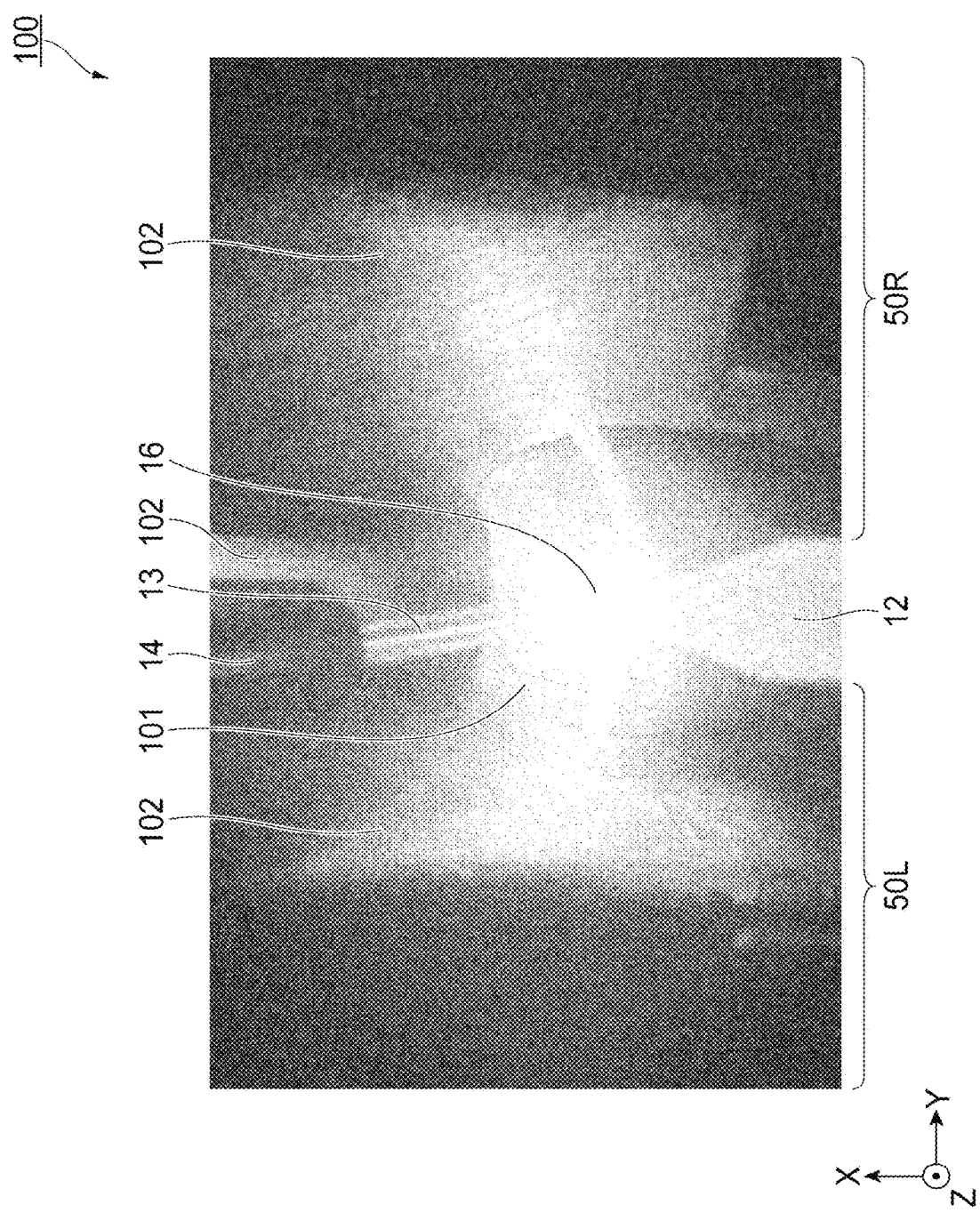
FIG. 2 is a photograph representing an example of an image of a region where arc welding is performed, the image being captured by a visual sensor.

In this embodiment, the visual sensor 11 is installed, with respect to the welding torch 12, on a side toward which the welding progresses. Stated in another way, the visual sensor 11 is installed in front of the welding torch 12 in the welding direction. FIG. 2 is a photograph representing an example of an image 100 of the region where the arc welding is performed, the image 100 being captured by the visual sensor 11.

The image 100 includes a fusion zone 101 and non-fusion zones 102 around the fusion zone 101. The fusion zone 101 is formed by the molten filler wire 13. In the following description, the fusion zone 101 is also called a molten pool. The non-fusion zones 102 include a groove-defining portion of a to-be-welded material 50L positioned on a left side of the root gap, which is one side with respect to the Y-axis direction, a groove-defining portion of a to-be-welded material 50H positioned on a right side of the root gap, which is the other side with respect to the Y-axis direction, and a non-fusion zone of the root gap. The welding torch 12, the filler wire 13, and the conduit cable 14 are further reflected in the image 100.

In this embodiment, the visual sensor 11 is disposed in a space between the conduit cable 14, supporting the filler wire 13, and the welding torch 12. Although any type of the visual sensor 11 may be used, it is preferable that the visual sensor 11 can capture an image over a wide wavelength range from a ultraviolet range to an infrared range and has a dynamic range as wide as possible. In this embodiment, a mounting position of the visual sensor 11 is fixed and a range where the image 100 is captured by the visual sensor 11 is also substantially fixed. Instead, the image capturing range may be zoomed in, closed up, or swung in accordance with, for example, weaving of the welding torch 12 without fixing the image capturing range.

The brightness of the arc 16 changes depending on a welding current. If the brightness changes, a difficulty arises in recognizing, in the image 100 captured by the visual sensor 11, shapes of end portions of the to-be-welded materials 50L and 50R defining the root gap and shapes of tip portions of the molten pool. Therefore, it is preferable to adjust an amount and a wavelength of incident light per unit time by using, in accordance with the welding current, a shutter speed, a diaphragm, a ND (Neutral Density) filter, a bandpass filter, a short-pass filter, a long-pass filter, and so on.

The shutter speed, the diaphragm, and the ND filter affect the amount of light incident on the visual sensor 11, whereas the bandpass filter, the short-pass filter, and the long-pass filter affect the wavelength that is obtainable by the visual sensor 11. In an example, when the welding current is lower than 200 A, the shutter speed, the diaphragm, the ND filter, and so on are preferably adjusted to allow light to pass therethrough at a predetermined wavelength or in a predetermined wavelength range such that the amount of the light obtainable by the visual sensor 11 falls within a range of 15 to 95%, namely such that, assuming the amount of the incident light to be 100, the amount of the light obtainable by the visual sensor 11 ranges from 15 to 95. In another example, when the welding current is from 200 A to 400 A, the shutter speed, the diaphragm, the ND filter, and so on are preferably adjusted to allow light to pass therethrough at the predetermined wavelength or in the predetermined wavelength range such that the amount of the light obtainable by the visual sensor 11 falls within a range of 5 to 90%, namely such that, assuming the amount of the incident light to be 100, the amount of the light obtainable by the visual sensor 11 ranges from 5 to 90. In still another example, when the welding current is over 500 A, the shutter speed, the diaphragm, the ND filter, and so on are preferably adjusted to allow light to pass therethrough at the predetermined wavelength or in the predetermined wavelength range such that the amount of the light obtainable by the visual sensor 11 falls within a range of 0.5 to 85, namely such that, assuming the amount of the incident light to be 100, the amount of the light obtainable by the visual sensor 11 ranges from 0.5 to 85. Furthermore, the wavelength or the wavelength range of the light incident on the visual sensor 11 is preferably selected from a range of 500 to 1200 nm, for example. More preferably, the amount of the light obtainable by the visual sensor 11 is automatically adjusted in accordance with the control of the welding conditions. In addition, a brightness value at an arbitrary location in the captured image 100 may be measured and automatic adjustment may be performed such that the measured brightness value is controlled to a preset brightness value. The arbitrary location is, for example, the molten pool.

<Configuration of Welding Control Device 20>

In this embodiment, the welding control device 20 (see FIG. 1) is disposed away from the welding apparatus 10 (see FIG. 1) that is mounted to the carriage 30 (see FIG. 1), and performs control for operations of various components in the welding apparatus 10, control of the welding conditions, and control for operations of processing, computing, and determining the image captured by the visual sensor 11 and outputting correction amounts of the welding conditions, and so on.

The control of operations of various components in the welding apparatus 10 includes, for example, operation control for sliding of the 2-axis slider which contributes to a weaving condition, a welding speed given by a moving speed of the carriage 30, a supply speed of the filler wire 13, and so on in accordance with, for example, the preset welding conditions. Although all types of control may be performed with one control panel, the welding control device 20 may be divided for each of uses. In addition, the welding control device 20 performs control of storing and outputting the welding conditions.

Figure 3:
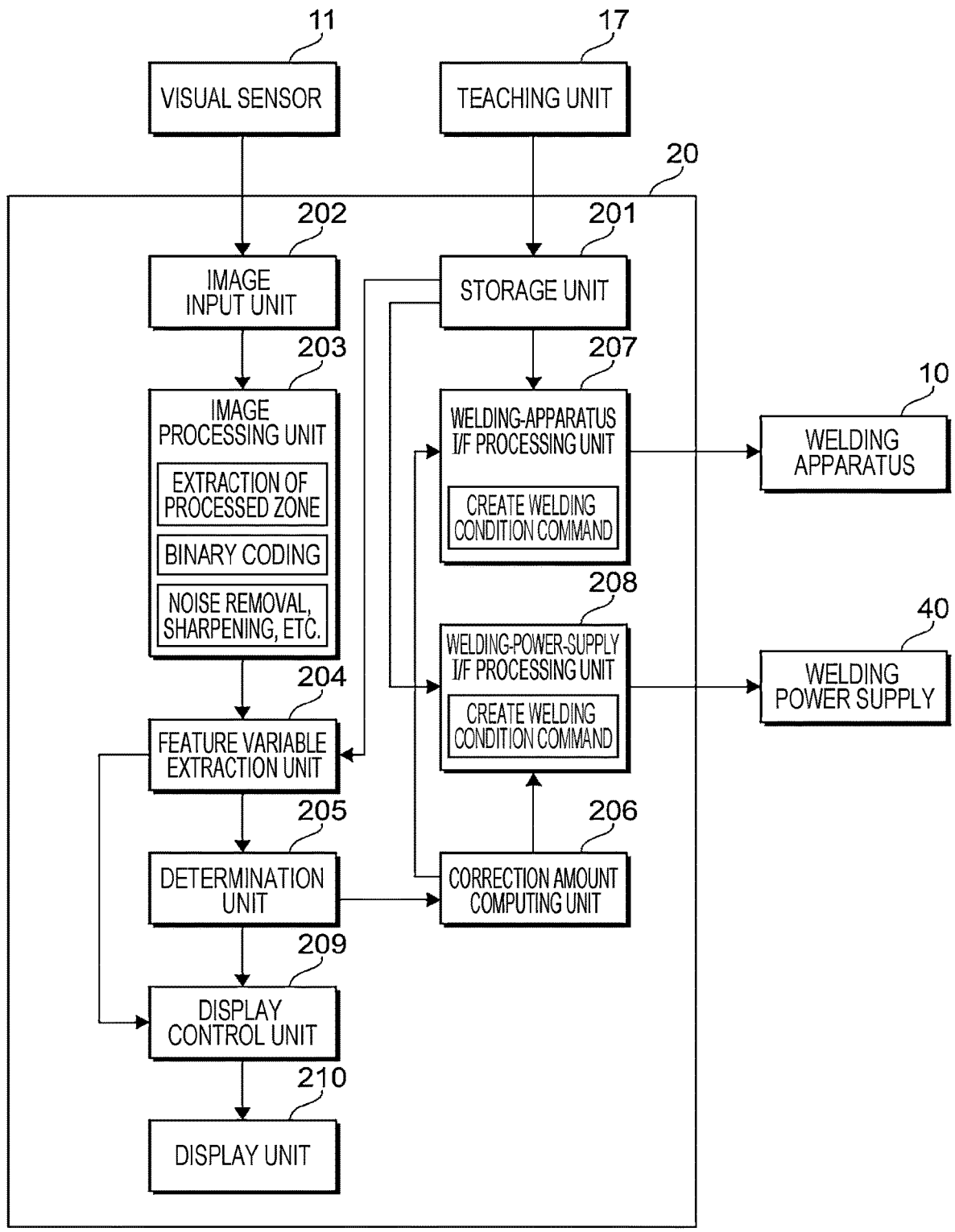
FIG. 3 is a block diagram representing configurations of various components that constitute the welding control device.

FIG. 3 is a block diagram representing configurations of various components that constitute the welding control device 20.

The welding control device 20 includes a storage unit 201, an image input unit 202, an image processing unit 203, a feature variable extraction unit 204, a determination unit 205, a correction amount computing unit 206, a welding-apparatus I/F processing unit 207, and a welding-power-supply I/F processing unit 208. The storage unit 201 stores the welding conditions that are preset using the teaching unit 17, for example. The stored welding conditions include, for example, the welding current, the arc voltage, the welding speed given by the moving speed of the carriage 30, the feed speed of the filler wire 13, the weaving condition, conditions of the to-be-welded materials 50L and 50R, and so on. The weaving condition includes information about, for example, an oscillation speed, an oscillation pause time, an oscillation width, a reversion height, a shift amount, and so on. The conditions of the to-be-welded materials 50L and 50R include information about, for example, a plate thickness, a groove shape, a groove angle, the root gap, and so on.

The image captured by the visual sensor 11 is input to the image input unit 202.

The image processing unit 203 executes pre-processing for emphasizing an edge of the input image, extraction of a processed region, and so on. For example, noise removal, sharpening, binary coding, and so on are executed in the pre-processing for emphasizing the edge. For example, cutting out of an image to be processed, range designation, setting of a center point and a center axis, and so on are executed in the extraction of the processed region.

The feature variable extraction unit 204 executes extraction of predetermined feature variables from the image 100 after having been processed by the image processing unit 203.

Figure 4:
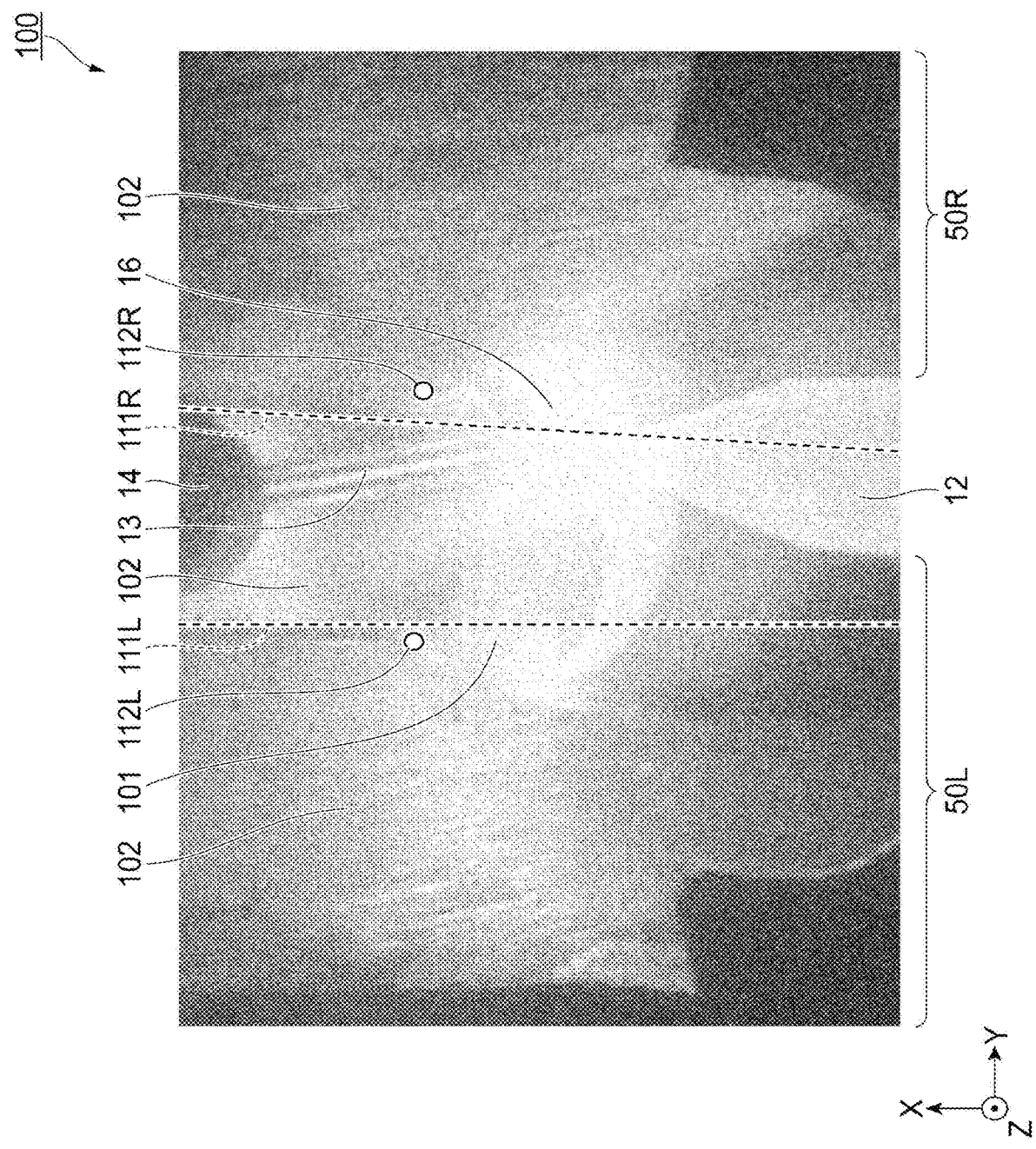
FIG. 4 is an explanatory view representing examples of feature variables extracted by a feature variable extraction unit.

FIG. 4 is an explanatory view representing examples of the feature variables extracted by the feature variable extraction unit 204 (see FIG. 3). An image 100 before the extraction of the feature variables corresponds to the image 100 illustrated in FIG. 2.

In this embodiment, the feature variable extraction unit 204 extracts, as the feature variables, a left edge line 111L defining a left end of the root gap, a right edge line 111R defining a right end of the root gap, and a left end point 112L and a right end point 112R of the fusion zone 101, which are respectively a left-side tip and a right-side tip of the fusion zone 101 growing in the direction in which the welding progresses. The fusion zone 101 is formed near wall surfaces of the to-be-welded materials 50L and 50R, the wall surfaces defining the groove.

The feature variable extraction unit 204 in this embodiment is not only an example of first detection means, but also an example of second detection means.

Figure 5C:
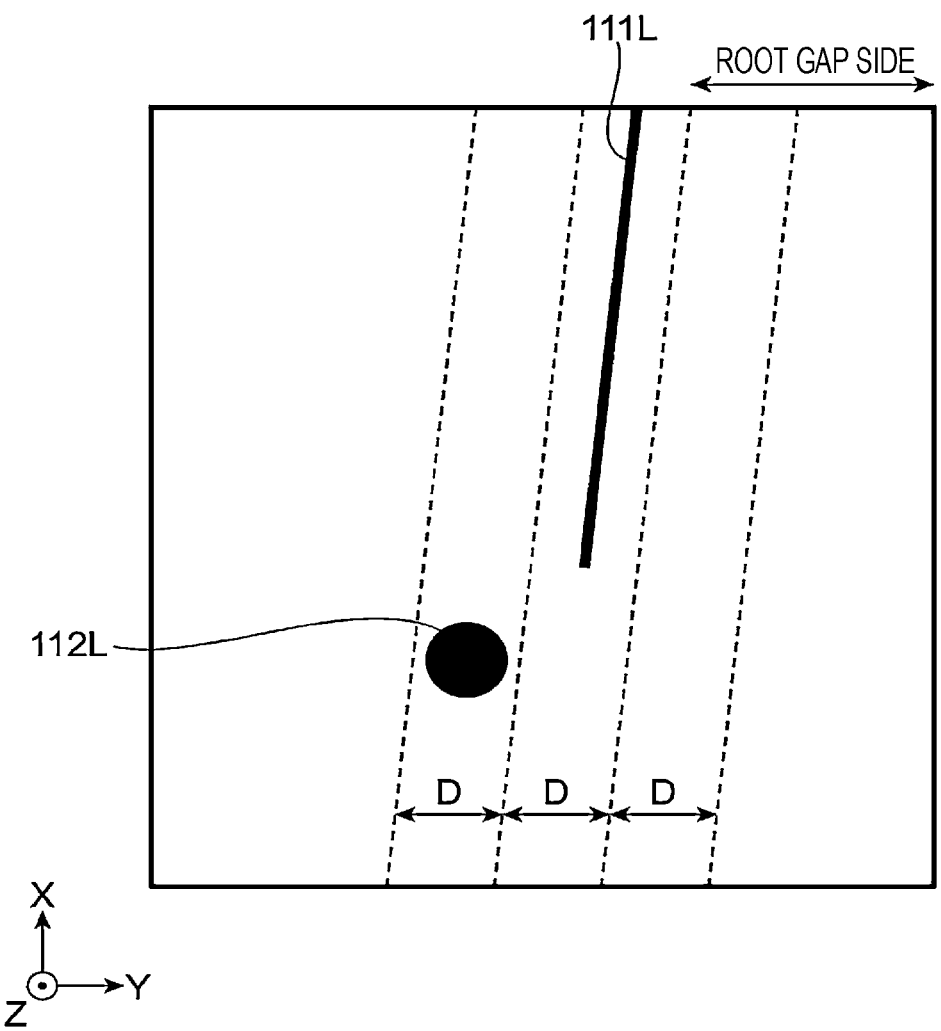
FIG. 5C is an explanatory view representing the case in which whether the fusion of the filler wire is suitable or unsuitable cannot be determined.

The determination unit 205 (see FIG. 3) determines suitability of the penetration bead formed on the backside based on a positional relation of the left end point 112L relative to the left edge line 111L both having been extracted by the feature variable extraction unit 204, and a positional relation of the right end point 112R relative to the right edge line 111R both having been extracted by the feature variable extraction unit 204. The determination unit 205 in this embodiment is an example of determination means. FIGS. 5A to 5D are explanatory views representing examples of a determination method performed by the determination unit 205. Each of FIGS. 5A to 5D represents the relation between the left edge line 111L and the left end point 112L. The relation between the right edge line 111R and the right end point 112R can also be determined in a similar manner. FIG. 5A is an explanatory view representing the case in which a molten amount of the filler wire 13 (see FIG. 1) is suitable. Dotted lines in FIG. 5A indicate boundary positions for determination with the left edge line 111L being a reference position. In this embodiment, a distance between the adjacent dotted lines in the Y-axis direction is assumed to be D. The distance D is given in advance. In FIG. 5A, the left end point 112L is positioned within 0.5D in the left-right direction relative to the left edge line 111L.

FIG. 5B is an explanatory view representing the case in which the fusion of the filler wire 13 (see FIG. 1) is unsuitable. In FIG. 5B, the left end point 112L is positioned away from the left edge line 111L leftward by 1.5D or more.

FIG. 5C is an explanatory view representing the case in which whether the fusion of the filler wire 13 (see FIG. 1) is suitable or unsuitable cannot be determined. In FIG. 5C, the left end point 112L is positioned away from the left edge line 111L leftward by 0.5 or more and less than 1.5D.

Figure 5D:
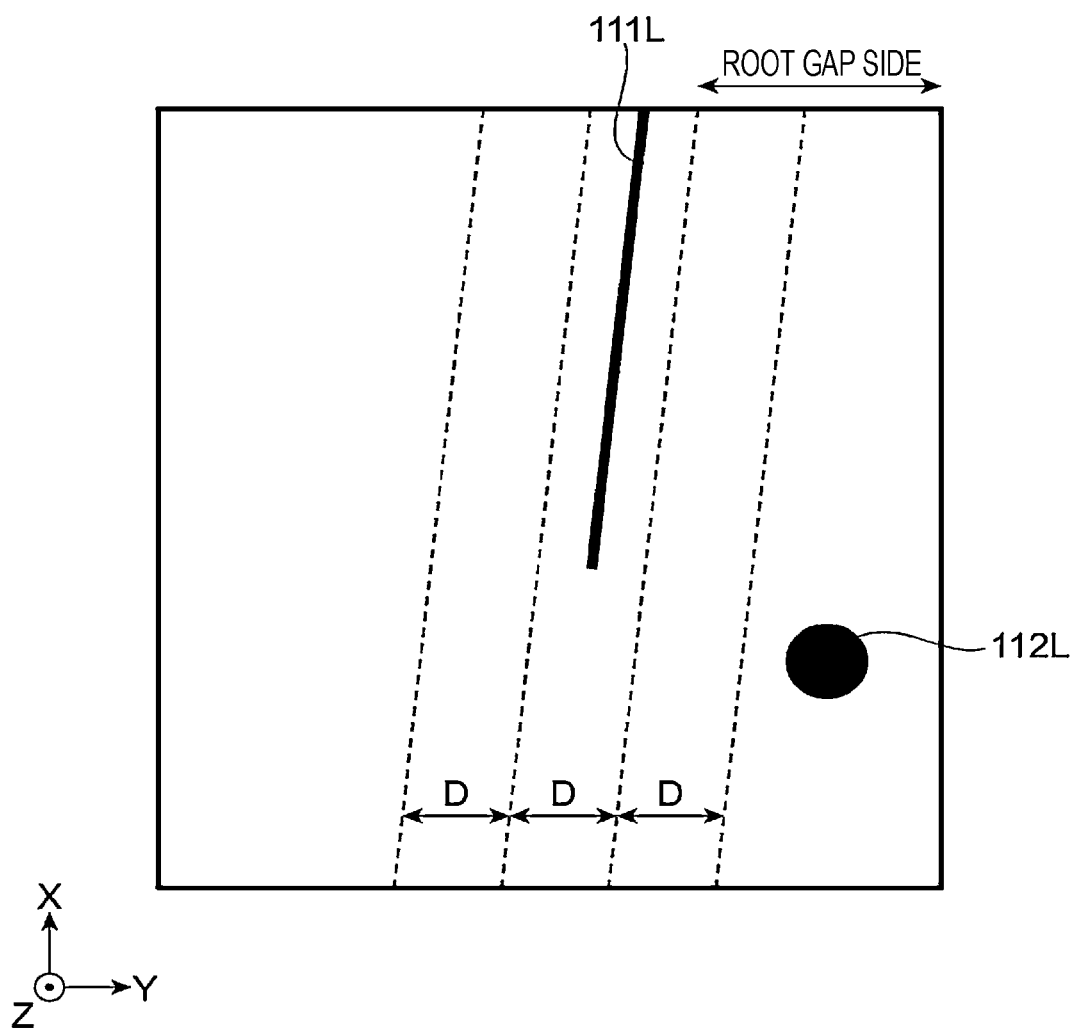
FIG. 5D is an explanatory view representing the case in which the fusion of the filler wire is unsuitable.

FIG. 5D is an explanatory view representing the case in which the fusion of the filler wire 13 (FIG. 1) is unsuitable. In FIG. 5D, the left end point 112L is positioned away from the left edge line 111L rightward by 1.5D or more.

In FIGS. 5A to 5D, the left direction is a direction away from the root gap, and the right direction is a direction closer to the center line of the root gap.

The correction amount computing unit 206 (FIG. 3) computes a correction amount depending on a determination result of the determination unit 205 (see FIG. 3). For example, when the positional relation between the left edge line 111L and the left end point 112L is as per illustrated in FIG. 5B or 5D and a current state of the penetration bead is determined to be unsatisfactory, the correction amount computing unit 206 computes the correction amount of at least one welding condition.

Preferably, the correction amount computing unit 206 computes the correction amount of the welding condition regarding one or more among, for example, the welding current, the arc voltage, the welding speed, the wire feed speed, an electrode position, a wire insertion position, and the weaving condition.

The welding condition stored in the storage unit 201 (see FIG. 3) and the correction amount computed by the correction amount computing unit 206 are input to the welding-apparatus I/F processing unit 207 (see FIG. 3) and the welding-power-supply I/F processing unit 208 (see FIG. 3). The welding-apparatus I/F processing unit 207 produces, based on the welding condition and the correction amount having been input thereto, a welding condition command that is output to the welding apparatus 10. The welding-power-supply I/F processing unit 208 produces, based on the welding condition and the correction amount having been input thereto, a welding condition command that is output to the welding power supply 40.

The correction amount computing unit 206, the welding-apparatus I/F processing unit 207, and the welding-power-supply I/F processing unit 208 are an example of control means that controls the welding condition.

A display control unit 209 (see FIG. 3) executes a process of displaying the determination result of the determination unit 205 on a screen of a display unit 210 (see FIG. 3). For example, the display control unit 209 displays a tip point of the molten pool and a straight line defining the end of the root gap, the tip point and the straight line being extracted by the feature variable extraction unit 204, in a superimposed relation to the image 100 captured by the visual sensor 11. For example, the left end point 112L and the corresponding left edge line 111L are displayed in a superimposed relation to the image 100. Instead, the right end point 112R and the corresponding right edge line 111R are displayed in a superimposed relation to the image 100. The above-mentioned display is performed in parallel to the extraction of the feature variables.

Furthermore, the display control unit 209 displays the determination result of the determination unit 205, namely the information representing the suitability of the welding, in correspondence to each of the left end point 112L and the right end point 112R. In this embodiment, the determination results regarding the left end point 112L and the right end point 112R are displayed on a time series basis. The display control unit 209 in this embodiment is not only an example of a display control device, but also an example of the display control means.

<Control Method>

Figure 6:
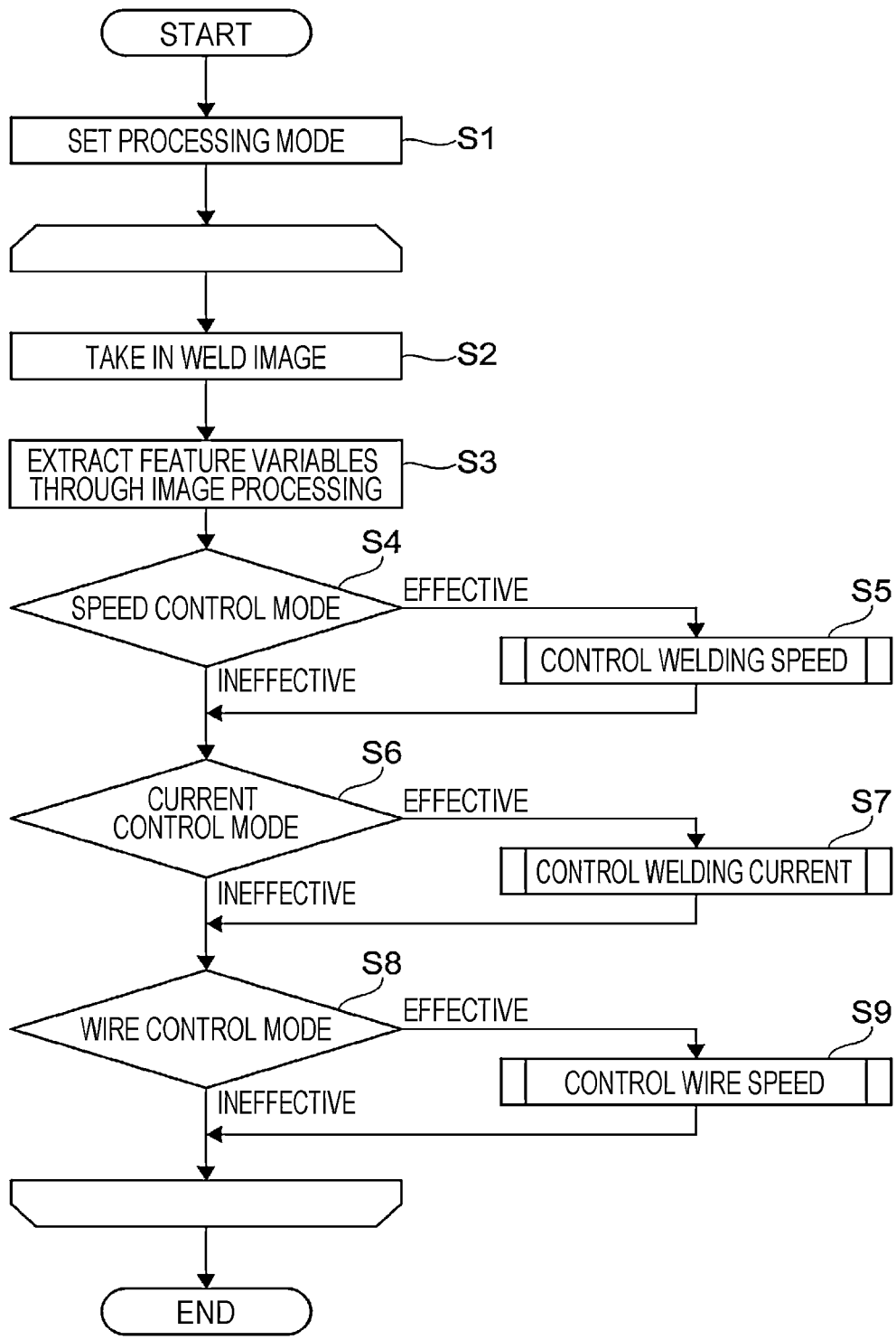
FIG. 6 is a flowchart representing an example of a welding control method with which the welding system according to the embodiment can form a satisfactory penetration bead.

FIG. 6 is a flowchart representing an example of a welding control method with which the welding system 1 (see FIG. 1) according to the embodiment can form a satisfactory penetration bead.

In this embodiment, control illustrated in FIG. 6 is executed by the welding control device 20 (see FIG. 1). A sign S in the drawing denotes a step.

First, the welding control device 20 sets a processing mode (step 1). Here, a welding condition road out from the teaching unit 17 is set into the storage unit 201.

The welding condition preferably includes one or more among, for example, the welding current, the arc voltage, the welding speed, the wire feed speed, the electrode position, the wire insertion position, and the weaving condition.

In this embodiment, whether to control the welding speed, the welding current, and the wire feed speed or not is set. One or more control types among a "speed control mode", a "current control mode", and a "wire control mode" can be selected by setting "effective" or "ineffective" for each of the control modes.

After the various conditions have been set into the storage unit 201, the welding control device 20 instructs the start of welding.

After the start of the welding, the visual sensor 11 captures the image 100 including the fusion zone 101 and the non-fusion zones 102 in the vicinity of an arc and outputs image data corresponding to the captured image 100. The image data is input to the image input unit 202 of the welding control device 20 (step 2). In other words, a weld image is taken in.

Then, the image processing unit 203 cuts out, as a processed image, a preset region from the input image and executes the pre-processing for emphasizing the edge, such as noise removal, sharpening, and binary coding, on the cut-out image.

Figure 7:
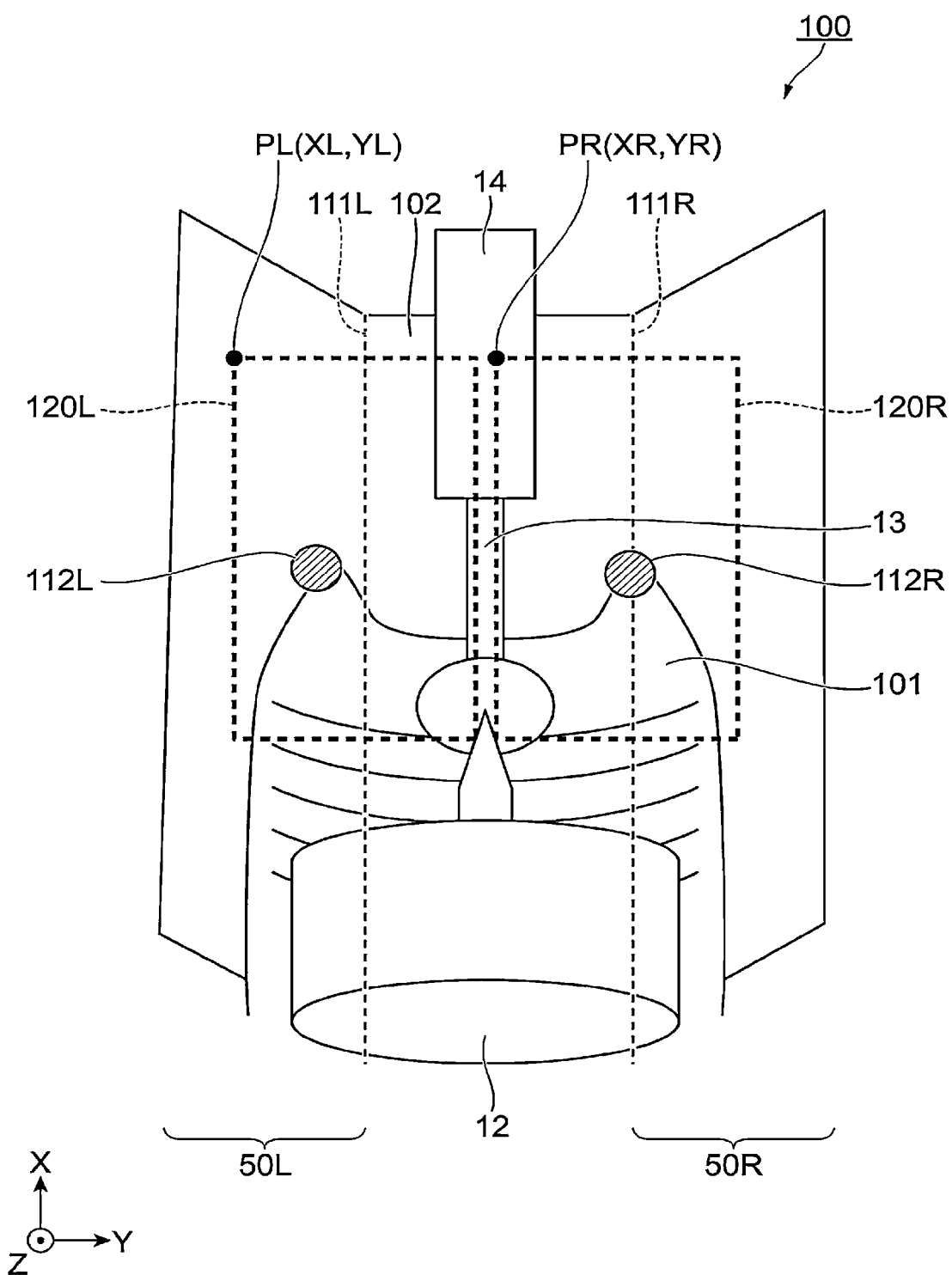
FIG. 7 is an explanatory view representing an example of regions that are cut out as processed images.

FIG. 7 is an explanatory view representing an example of regions that are cut out as processed images.

As a matter of course, the example of the cutting-out illustrated in FIG. 7 is merely one example.

In the exemplary case of FIG. 7, two processed regions 120L and 120R including two tip points of the fusion zone 101 in a one-to-one relation are cut out. The processed region 120L includes the left end point 112L of the fusion zone 101 and the wall surface of the to-be-welded material 50L on the left side, that wall surface defining the groove. The processed region 120R includes the right end point 112R of the fusion zone 101 and the wall surface of the to-be-welded material 50R on the right side, that wall surface defining the groove.

The processed regions 120L and 120R are cut out respectively based on reference points PL and PR that are designated in advance. A position within the processed region 120L is given based on the reference point PL, and a position within the processed region 120R is given based on the reference point PR.

The processed regions 120L and 120R may be fixedly based on the preset reference points PL and PR. Instead, areas to be set as the processed regions 120L and 120R may be changed each time the image 100 input to the image processing unit 203 is changed. For example, a tip of the welding torch 12 under weaving may be set as a reference point and the processed region may be changed in accordance with the weaving.

Return to the explanation of FIG. 6.

After the end of the above-described image processing, the feature variable extraction unit 204 extracts the feature variables through image processing (step 3). In this embodiment, the feature variable extraction unit 204 extracts, as the feature variables, the left edge line 111L corresponding to the left end of the root gap, the right edge line 111R corresponding to the right end of the root gap, the left end point 112L given by the left-side tip of the molten pool, and the right end point 112R given by the right-side tip of the molten pool.

The left edge line 111L and the right edge line 111R are extracted through Hough conversion of the image after having been binary-coded. In this embodiment, the left edge line 111L and the right edge line 111R are obtained respectively by executing Hough conversion for each of the processed regions 120L and 120R, and by selecting the longest ones among a plurality of straight lines that have been detected for each of the processed regions 120L and 120R. In this embodiment, the straight lines are each expressed by a linear function, namely x=ay+b. Here, x and y denote coordinate values with respect to the reference point PL or PR, a denotes a gradient, and b denotes an intercept.

The feature variable extraction unit 204 detects, as the left end point 112L, a circular arc shape defining the tip of the molten pool, which is included in the processed region 120L, and detects, as the right end point 112R, a circular arc shape defining the tip of the molten pool, which is included in the processed region 120R.

Information of the feature variables extracted from the image 100 and corresponding to the processed regions 120L and 120R is given to the determination unit 205. The determination unit 205 determines the positional relation between the left end point 112L and the left edge line 111L of the root gap or the positional relation between the right end point 112R and the right edge line 111R of the root gap, as described above with reference to FIGS. 5A to 5D. If it is determined that even one of those positional relations implies a failure of the welding, the correction amount computing unit 206 computes the correction amount of the welding condition that is previously set by the correction amount computing unit 206.

Then, the determination unit 205 and the correction amount computing unit 206 determine whether settings of the speed control mode (step 4), the current control mode (step 6), and the wire control mode (step 8) are effective or ineffective for each of the control modes.

If the setting of the speed control mode is effective (namely, if the determination result in step 4 is "EFFECTIVE"), the determination unit 205 and the correction amount computing unit 206 control the welding speed (step 5). Thereafter, the determination unit 205 and the correction amount computing unit 206 go to step 6.

If the setting of the speed control mode is ineffective (namely, if the determination result in step 4 is "INEFFECTIVE"), the determination unit 205 and the correction amount computing unit 206 determine whether the current control mode is effective (step 6).

If the setting of the current control mode is effective (namely, if the determination result in step 6 is "EFFECTIVE"), the determination unit 205 and the correction amount computing unit 206 control the welding current (step 7). Thereafter, the determination unit 205 and the correction amount computing unit 206 go to step 8.

If the setting of the current control mode is ineffective (namely, if the determination result in step 6 is "INEFFECTIVE"), the determination unit 205 and the correction amount computing unit 206 determine whether the wire control mode is effective (step 8).

If the setting of the wire control mode is effective (namely, if the determination result in step 8 is "EFFECTIVE"), the determination unit 205 and the correction amount computing unit 206 control a wire speed (step 9). Thereafter, the determination unit 205 and the correction amount computing unit 206 return to step 2.

If the setting of the wire control mode is ineffective (namely, if the determination result in step 8 is "INEFFECTIVE"), the determination unit 205 and the correction amount computing unit 206 return to step 2.

The above-mentioned loop process is repeated during a period in which the welding of the to-be-welded materials 50L and 50R is performed.

Details of the control of the welding speed in step 5, the control of the welding current in step 7, and the control of the wire speed in step 9 are described below.

<Control of Welding Speed>

Figure 8:
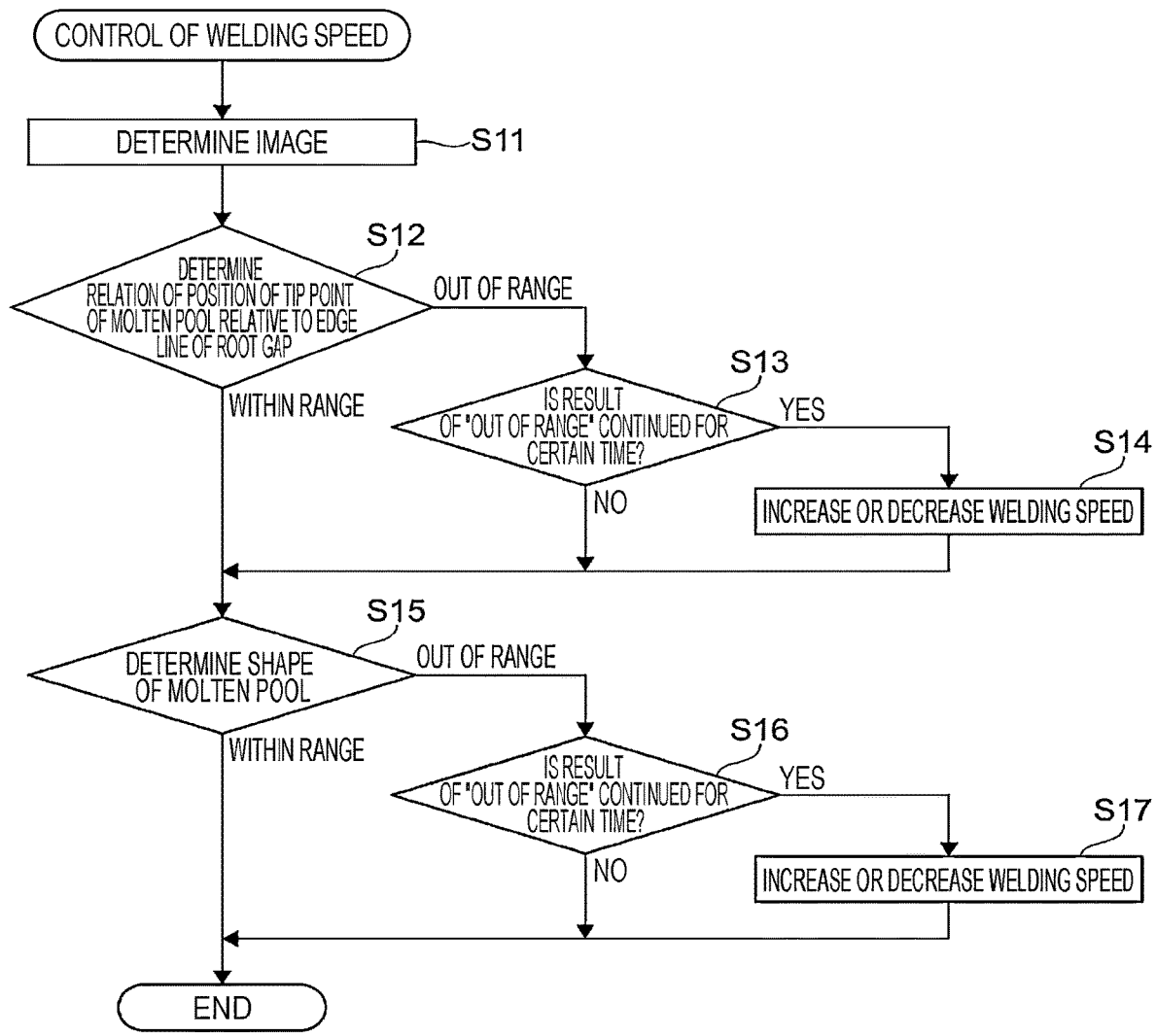
FIG. 8 is a flowchart representing details of control that is executed when setting of a speed control mode is effective.

FIG. 8 is a flowchart representing details of the control that is executed when the setting of the speed control mode is effective.

First, the determination unit 205 determines the image 100 (step 11).

The determination unit 205 determines the positional relation of the extracted tip point of the molten pool relative to the extracted edge line of the root gap (step 12). More specifically, the determination unit 205 determines whether the extracted left end point 112L satisfies the relation illustrated in FIG. 5A relative to the extracted left edge line 111L of the root gap. In other words, whether a relative distance between the left end point 112L and the left edge line 111L of the root gap is within or out of a predetermined range is determined. Similarly, the determination unit 205 determines whether the extracted right end point 112R satisfies the relation illustrated in FIG. 5A relative to the extracted right edge line 111R of the root gap. In other words, whether a relative distance between the right end point 112R and the right edge line 111R of the root gap is within or out of a predetermined range is determined.

In this embodiment, the determination unit 205 computes a distance LL between the left end point 112L and the left edge line 111L of the root gap, or a distance LR between the right end point 112R and the right edge line 111R of the root gap. Both the distances LL and LR are computed at a Lime depending on a position of the welding torch 12 (see FIG. 1) under a weaving operation in the image. In the following description, the distance LL and the distance LR are also collectively called a distance L.

In this embodiment, assuming that coordinates of the left end point 112L or the right end point 112R corresponding to the tip end of the molten pool is representatively expressed by (X1, Y1) and a linear function defining the left edge line 111L or the right edge line 111R of the root gap is representatively expressed by x=ay+b, the distance L is expressed by the following equation.

$$L = \mathrm{abs}(X1 - aY1 - b)/\sqrt{(X1^2 + Y1^2)} \qquad (\text{Eq. 1})$$

Here, abs( ) denotes a function providing an absolute value of a numeral put in a parenthesis. Furthermore, a denotes a gradient and b denotes an intercept.

If the distance L is within the predetermined range, the determination unit 205 determines that the penetration bead is satisfactory. On the other hand, if the distance L is out of the predetermined range, the determination unit 205 determines that the penetration bead is unsatisfactory.

If the determination result in step 12 is "OUT OF RANGE", namely if the penetration bead is determined to be unsatisfactory, the determination unit 205 further determines whether the result of "OUT OF RANGE" is continued for a predetermined certain time (step 13).

If the determination result in step 13 is "NO", the determination unit 205 determines that the unsatisfactory result is simply caused by the disturbances, and then goes to step 15. In this case, the welding speed is maintained. On the other hand, if the determination result in stop 13 is "YES", the determination unit 205 determines that the penetration bead is continuously unsatisfactory. In this embodiment, the correction amount computing unit 206 computes the correction amount to increase or decrease the welding speed (step 14). For example, if the determination result in step 12 indicates the state as per illustrated in FIG. 5B, the correction amount is computed to increase the welding speed, and if the determination result indicates the state as per illustrated in FIG. 5D, the correction amount is computed to decrease the welding speed. In this case, the welding speed after the correction is output as the welding condition command to the welding apparatus 10. In this embodiment, the welding speed is assumed to be the moving speed of the carriage 30.

As described above, the correction amount of the welding speed is preferably computed based on the distance relation between the tip point of the molten pool and the edge line of the root gap and the Lime during which the distance is continuously determined to be unsatisfactory.

In this embodiment, the determination unit 205 further determines a shape of the molten pool (step 15). Whether to execute the determination regarding the shape of the molten pool or not is optional.

Although the satisfactory penetration head can be maintained by controlling the welding speed based on the distance relation between the tip point of the molten pool and the edge line of the root gap, an amount of weld metal also changes depending on an increase and a decrease of the welding speed.

In consideration of the above point, the determination unit 205 in this embodiment obtains information about, for example, a width, an area, and a volume of the molten pool from the image 100 of the processed region 120L or 120R, and detects the shape of the molten pool based on the obtained information. Moreover, the determination unit 205 compares the detected shape of the molten pool with a preset ideal shape or evaluates a difference between the detected shape and the ideal shape, and determines whether the detected shape of the molten pool is within or out of a predetermined range relative to the ideal shape (stop 15).

If the determination result in step 15 is "OUT OF RANGE", the determination unit 205 further determines whether the result of "OUT OF RANGE" is continued for a predetermined certain time (step 16).

If the determination result in step 16 is "NO", the determination unit 205 determines that the determination result of the shape being "OUT OF RANGE" is simply caused by the disturbances, and then brings the processing to an end while the welding speed at the present time is maintained.

On the other hand, if the determination result in step 16 is "YES", the determination unit 205 determines that the shape is continuously out of the range. In this embodiment, the correction amount computing unit 206 computes the correction amount to increase or decrease the welding speed (step 17). For example, if it is determined that the welding speed is excessively increased in step 14 and the amount of the weld metal is increased beyond a specified range, an adjustment is performed to decrease the welding speed and to make the shape of the molten pool closer to the ideal shape.

In that case, the welding speed in consideration of both the correction amounts computed in step 14 and step 17 is output as the welding condition command to the welding apparatus 10.

As described above, the correction amount of the welding speed is preferably computed in consideration of not only the distance relation between the tip point of the molten pool and the edge line of the root gap and the time during which the distance is continuously determined to be unsatisfactory, but also a change in the shape of the molten pool.

<Control of Welding Current>

Figure 9:
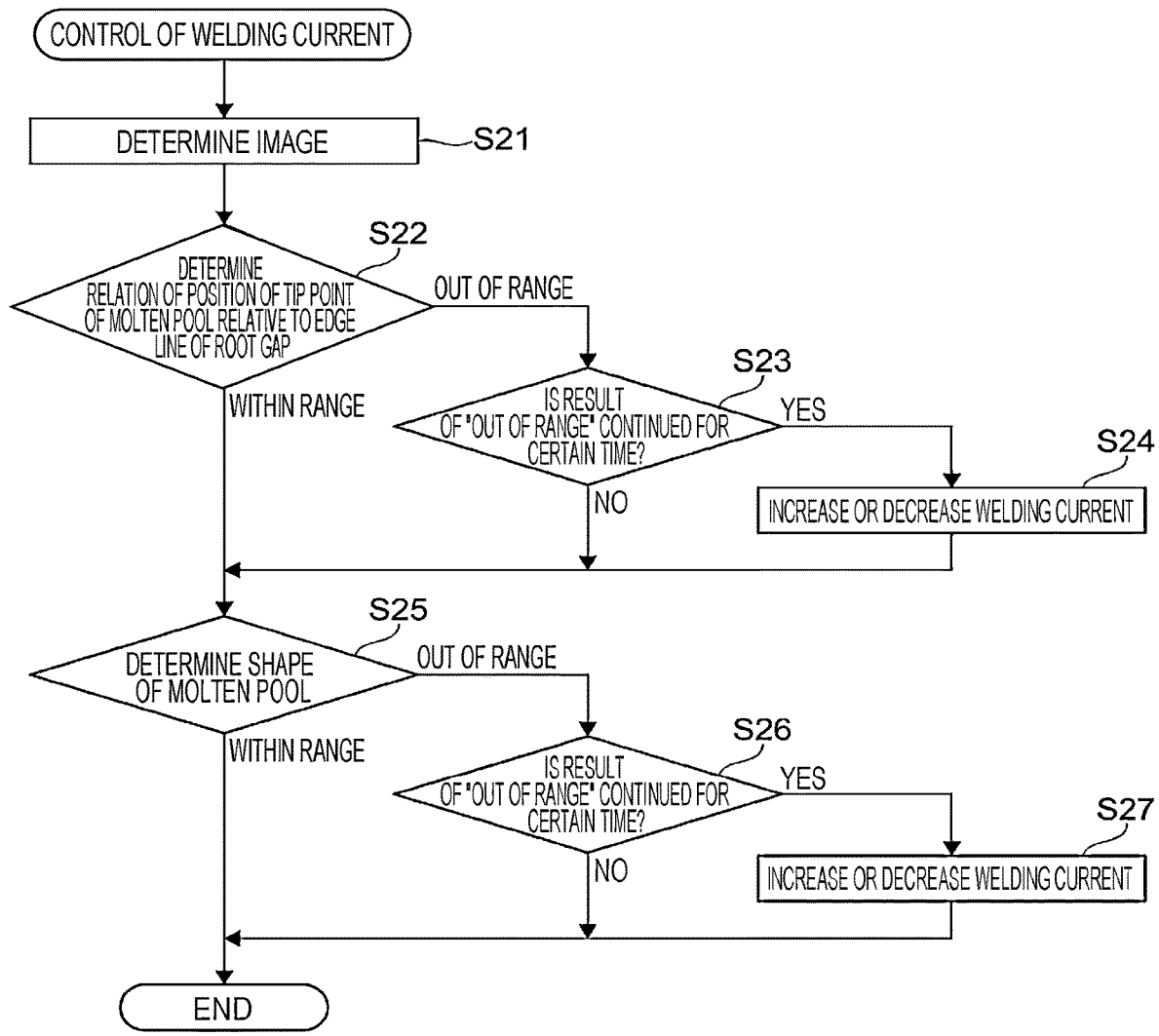
FIG. 9 is a flowchart representing details of control that is executed when setting of a current control mode is effective.

FIG. 9 is a flowchart representing details of the control that is executed when the setting of the current control mode is effective.

First, the determination unit 205 determines the image 100 (step 21).

The determination unit 205 determines the positional relation of the extracted tip point of the molten pool relative to the extracted edge line of the root gap (step 22). More specifically, the determination unit 205 determines whether the extracted left end point 112L satisfies the relation illustrated in FIG. 5A relative to the extracted left edge line 111L. In other words, whether a relative distance between the left end point 112L and the left edge line 111L is within or out of a predetermined range is determined. Similarly, the determination unit 205 determines whether the extracted right end point 112R satisfies the relation illustrated in FIG. 5A relative to the extracted right edge line 111R. In other words, whether a relative distance between the right end point 112R and the right edge line 111R is within or out of a predetermined range is determined.

In this embodiment, the determination unit 205 computes a distance LL between the left end point 112L and the left edge line 111L or a distance LR between the right end point 112R and the right edge line 111R. Both the distances LL and LR are computed at a time depending on a position of the welding torch 12 (see FIG. 1) under a weaving operation in the image. In the following description, the distance LL and the distance LR are also collectively called a distance L.

The distance L in this case is also computed using the above-described Eq. 1.

If the distance L is within the predetermined range, the determination unit 205 determines that the penetration bead is satisfactory. On the other hand, if the distance L is out of the predetermined range, the determination unit 205 determines that the penetration bead is unsatisfactory.

If the determination result in step 22 is "OUT OF RANGE", namely if the penetration bead is determined to be unsatisfactory, the determination unit 205 further determines whether the result of "OUT OF RANGE" is continued for a predetermined certain time (step 23).

If the determination result in step 23 is "NO", the determination unit 205 determines that the unsatisfactory result is simply caused by the disturbances, and then goes to step 26. In this case, the welding speed is maintained. On the other hand, if the determination result in step 23 is "YES", the determination unit 205 determines that the penetration bead is continuously unsatisfactory. In this embodiment, the correction amount computing unit 206 computes the correction amount to increase or decrease the welding current (step 24). For example, if the determination result in step 23 indicates the state as per illustrated in FIG. 5B, the correction amount is computed to decrease the welding current, and if the determination result indicates the state as per illustrated in FIG. 5D, the correction amount is computed to increase the welding current. When a waveform of the welding current is pulse-shaped, the welding current is preferably considered in terms of an average pulse current, for example. Because the average pulse current changes depending on parameters such as a peak current value, a base current value, a peak period, and a base period, one or more among those parameters are preferably decided in advance as parameters in accordance with which the average pulse current increases and decreases. In this case, the welding current after the correction is output as the welding condition command to the welding power supply 40.

As described above, the correction amount of the welding current is preferably computed based on the distance relation between the tip point of the molten pool and the edge line of the root gap and the time during which the distance is continuously determined to be unsatisfactory.

Also in this case, the determination unit 205 further determines a shape of the molten pool (step 25). Whether to execute the determination regarding the shape of the molten pool or not is also optional.

The determination unit 205 in this embodiment obtains information about, for example, a width, an area, and a volume of the molten pool from the image 100 of the processed region 120L or 120R, and detects the shape of the molten pool based on the obtained information. Moreover, the determination unit 205 compares the detected shape of the molten pool with a preset ideal shape or evaluates a difference between the detected shape and the ideal shape, and determines whether the detected shape of the molten pool is within or out of a predetermined range relative to the ideal shape (step 25).

If the determination result in step 25 is "OUT OF RANGE", the determination unit 205 further determines whether the result of "OUT OF RANGE" is continued for a predetermined certain time (step 26).

If the determination result in step 26 is "NO", the determination unit 205 determines that the determination result of the shape being "OUT OF RANGE" is simply caused by the disturbances, and then brings the processing to an end while the welding current and the pulse current at the present time are maintained.

On the other hand, if the determination result in step 26 is "YES", the determination unit 205 determines that the shape is continuously out of the range. In this embodiment, the correction amount computing unit 206 computes the correction amount to increase or decrease the welding current (step 27). For example, an adjustment is performed to decrease the welding current that has been excessively increased in step 24, thus making the shape of the molten pool closer to the ideal shape.

In that case, the welding current in consideration of both the correction amounts computed in step 24 and step 27 is output as the welding condition command to the welding power supply 40.

As described above, the correction amount of the welding current is preferably computed in consideration of not only the distance relation between the tip point of the molten pool and the edge line of the root gap and the time during which the distance is continuously determined to be unsatisfactory, but also a change in the shape of the molten pool.

<Control of Wire Speed>

Figure 10:
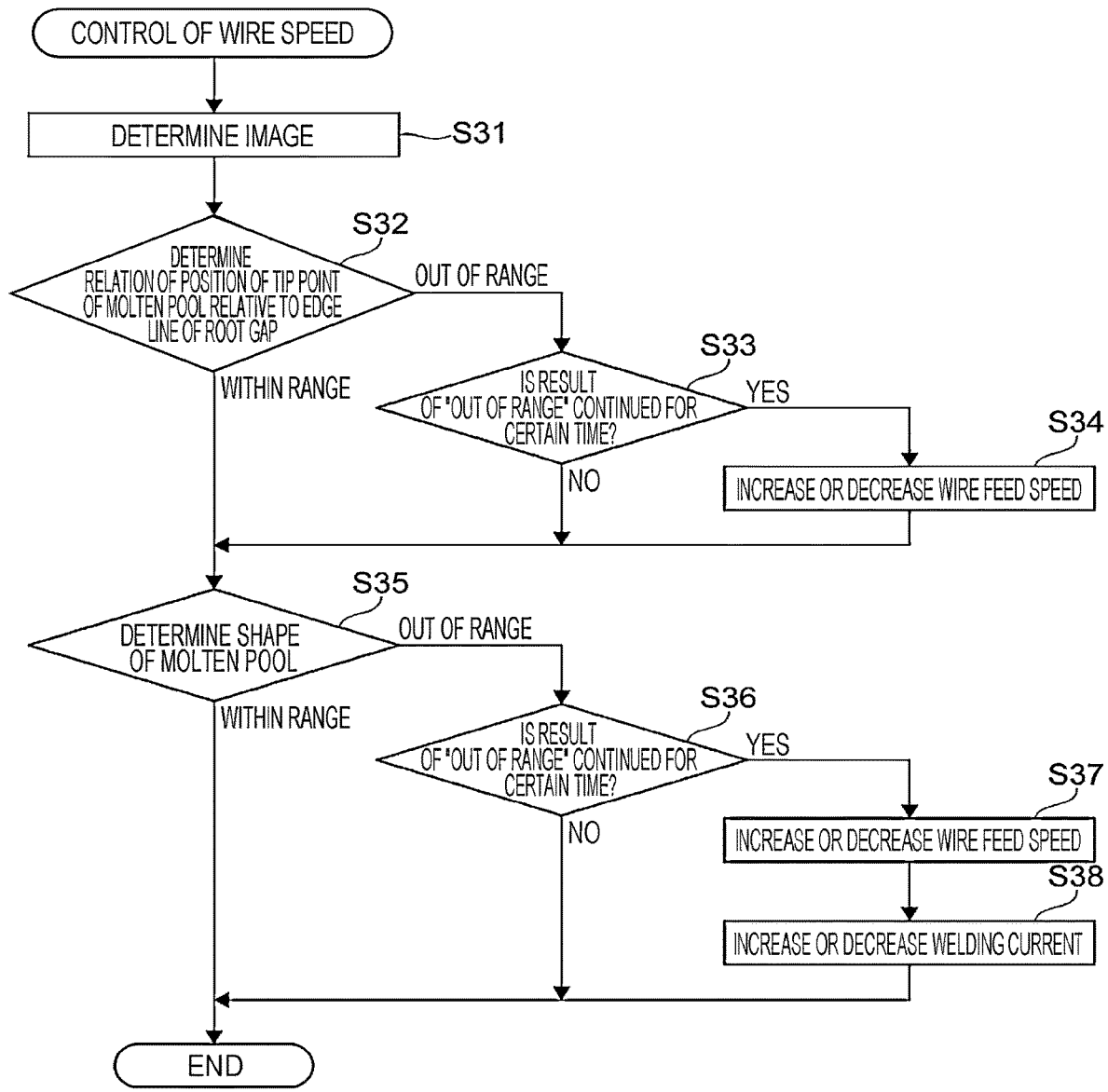
FIG. 10 is a flowchart representing details of control that is executed when setting of a wire control mode is effective.

FIG. 10 is a flowchart representing details of the control that is executed when the setting of the wire control mode is effective.

First, the determination unit 205 determines the image 100 (step 31).

The determination unit 205 determines the positional relation of the extracted tip point of the molten pool relative to the extracted edge line of the root gap (step 32). More specifically, the determination unit 205 determines whether the extracted left end point 112L satisfies the relation illustrated in FIG. 5A relative to the extracted left edge line 111L. In other words, whether a relative distance between the left end point 112L and the left edge line 111L is within or out of a predetermined range is determined. Similarly, the determination unit 205 determines whether the extracted right end point 112R satisfies the relation illustrated in FIG. 5A relative to the extracted right edge line 111R. In other words, whether a relative distance between the right end point 112R and the right edge line 111R is within or out of a predetermined range is determined.

In this embodiment, the determination unit 205 computes a distance LL between the left end point 112L and the left edge line 111L or a distance LR between the right end point 112R and the right edge line 111R. Roth the distances LL and LR are computed at a time depending on a position of the welding torch 12 (see FIG. 1) under a weaving operation in the image. In the following description, the distance LL and the distance LR are also collectively called a distance L.

The distance L in this case is also computed using the above-described Eq. 1.

If the distance L is within the predetermined range, the determination unit 205 determines that the penetration bead is satisfactory. On the other hand, if the distance L is out of the predetermined range, the determination unit 205 determines that the penetration bead is unsatisfactory.

If the determination result in step 32 is "OUT OF RANGE", namely if the penetration bead is determined to be unsatisfactory, the determination unit 205 further determines whether the result of "OUT OF RANGE" is continued for a predetermined certain time (step 33).

If the determination result in step 33 is "NO", the determination unit 205 determines that the unsatisfactory result is simply caused by the disturbances, and then goes to step 35. In this case, the welding speed is maintained. On the other hand, if the determination result in step 33 is "YES", the determination unit 205 determines that the penetration bead is continuously unsatisfactory. In this embodiment, the correction amount computing unit 206 computes the correction amount to increase or decrease the wire feed speed (step 34). For example, if the determination result in step 33 indicates the state as per illustrated in FIG. 5B, the correction amount is computed to decrease the wire feed speed, and if the determination result indicates the state as per illustrated in FIG. 5D, the correction amount is computed to increase the wire feed speed. In this case, the wire feed speed after the correction is output as the welding condition command to the welding apparatus 10.

As described above, the correction amount of the wire feed speed is preferably computed based on the distance relation between the tip point of the molten pool and the edge line of the root gap and the time during which the distance is continuously determined to be unsatisfactory.

Also in this case, the determination unit 205 further determines a shape of the molten pool (step 35). Whether to execute the determination regarding the shape of the molten pool or not is also optional.

The determination unit 205 in this embodiment obtains information about, for example, a width, an area, and a volume of the molten pool from the image 100 of the processed region 120L or 120R, and detects the shape of the molten pool based on the obtained information. Moreover, the determination unit 205 compares the detected shape of the molten pool with a preset ideal shape or evaluates a difference between the detected shape and the ideal shape, and determines whether the detected shape of the molten pool is within or out of a predetermined range relative to the ideal shape (step 35).

If the determination result in step 35 is "OUT OF RANGE", the determination unit 205 further determines whether the result of "OUT OF RANGE" is continued for a predetermined certain time (step 36).

If the determination result in step 36 is "NO", the determination unit 205 determines that the determination result of the shape being "OUT OF RANGE" is simply caused by the disturbances, and then brings the processing to an end while the welding current and the pulse current at the present time are maintained.

On the other hand, if the determination result in step 36 is "YES", the determination unit 205 determines that the shape is continuously out of the range. In this embodiment, the correction amount computing unit 206 computes the correction amount to increase or decrease the wire food speed (stop 37). For example, an adjustment is performed to increase the wire feed speed that has been excessively decreased in step 34, thus making the shape of the molten pool closer to the ideal shape. Furthermore, the correction amount computing unit 206 computes the correction amount to increase or decrease the welding current (step 38).

In that case, the wire feed speed in consideration of both the correction amounts computed in step 34 and step 37 is output as the welding condition command to the welding apparatus 10.

As described above, the correction amount of the wire feed speed is preferably computed in consideration of not only the distance relation between the tip point of the molten pool and the edge line of the root gap and the time during which the distance is continuously determined to be unsatisfactory, but also a change in the shape of the molten pool.

<Processing Executed by Display Control Unit 209>

The display control unit 209 of the welding control device 20 according to this embodiment is given with a display function of enabling a worker to check the positions of the feature variables that have been extracted by the feature variable extraction unit 204. It is to be noted that whether to install such a display function or not is optional.

Figure 11A:
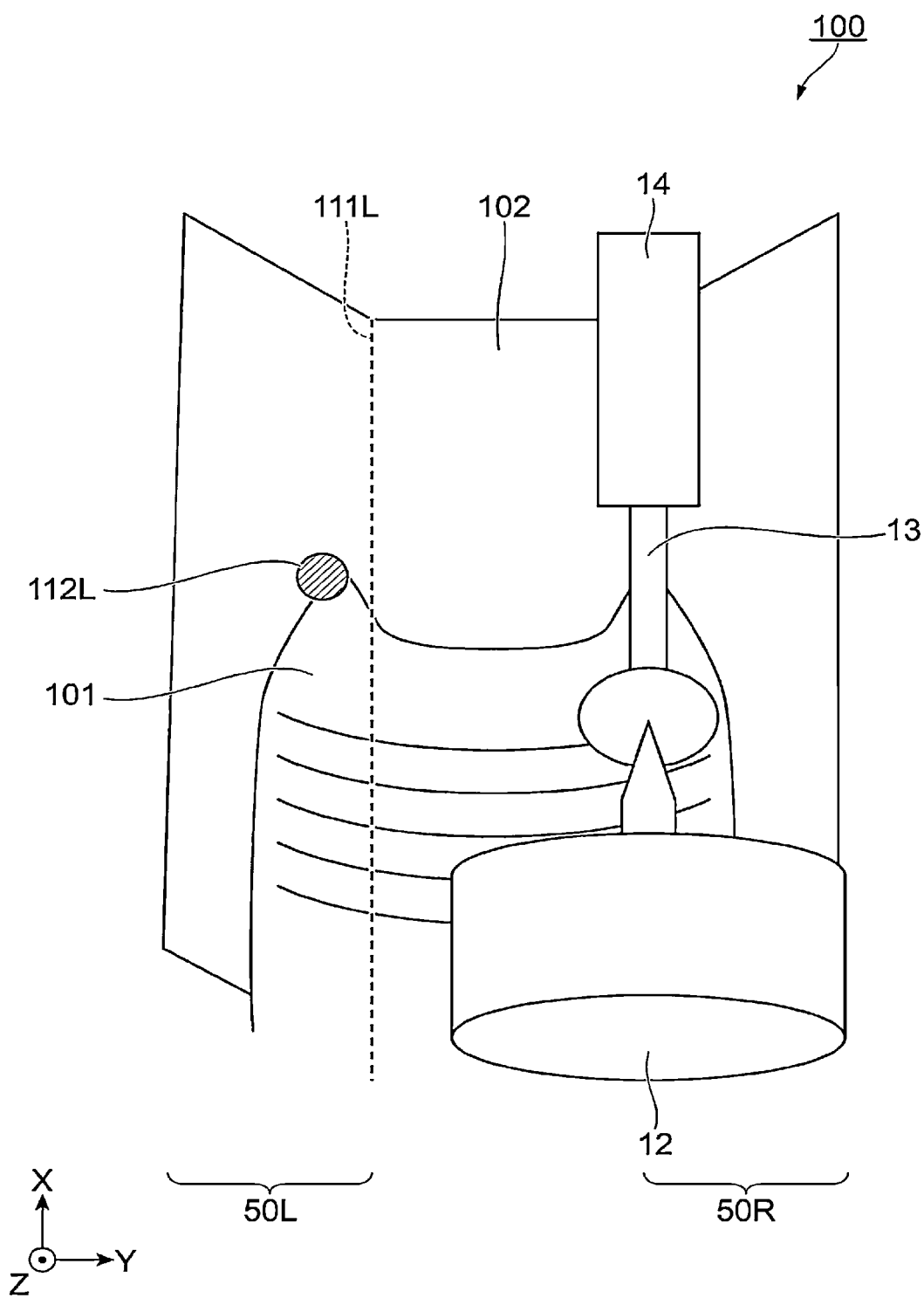
FIG. 11A is an explanatory view representing an example of a screen that displays a left end point and a corresponding left edge line, both having been extracted by the feature variable extraction unit, in a superimposed relation to the image captured by the visual sensor.

FIG. 11A is an explanatory view representing an example of a screen that displays the left end point 112L and the corresponding left edge line 111L, both extracted by the feature variable extraction unit 204, in a superimposed relation to the image 100 captured by the visual sensor 11. In FIG. 11A, the left end point 112L is denoted by a circular symbol, and the extracted left edge line 111L is denoted by a straight line.

Figure 11B:
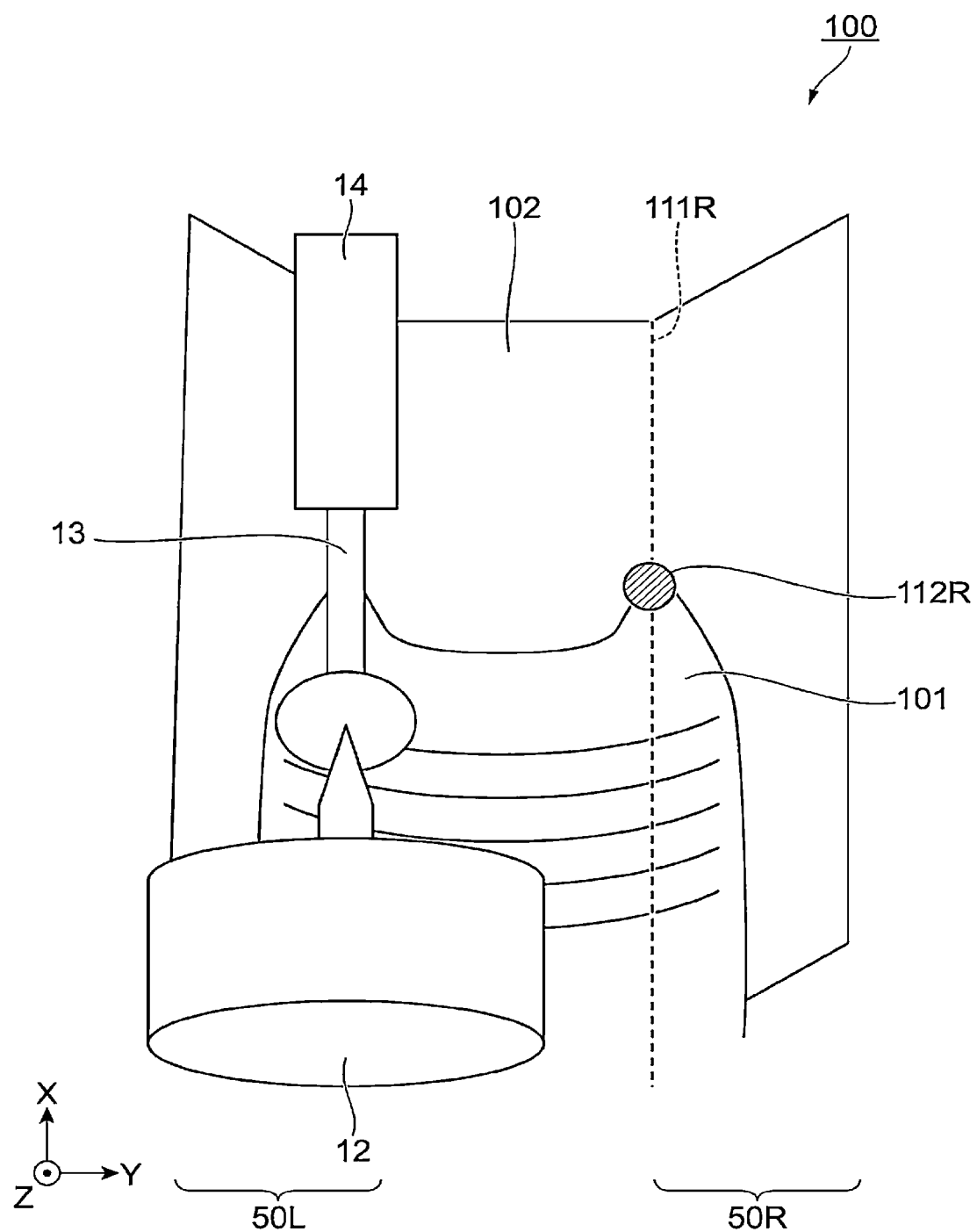
FIG. 11B is an explanatory view representing an example of a screen that displays a right end point and a corresponding right edge line, both having been extracted by the feature variable extraction unit, in a superimposed relation to the image captured by the visual sensor.

FIG. 11B is an explanatory view representing an example of a screen that displays the right end point 112R and the corresponding right edge line 111R, both having been extracted by the feature variable extraction unit 204 (see FIG. 3), in a superimposed relation to the image 100 captured by the visual sensor 11. In FIG. 11B, the right end point 112R is denoted by a circular symbol, and the extracted right edge line 111R is denoted by a straight line.

Display colors of the left end point 112L and the right end point 112R and display colors of the left edge line 111L and the right edge line 111R in FIGS. 11A and 11B are optional. For the purpose of making easier the check by the worker, brightness of the extracted feature point may be set to be higher than that of the surrounding image, or the display color may be set close to an opposite color to that of the surrounding image.

By displaying, as described above, the symbol and the straight line denoting the extracted feature variables in a superimposed relation to the image 100 from which the feature variables have been extracted, the worker can visually check whether the extraction is performed accurately.

The display control unit 209 of the welding control device 20 according to this embodiment is further given with a display function of enabling the worker to check the determination result of the determination unit 205. Whether to install such a display function or not is also optional.

Figure 12:
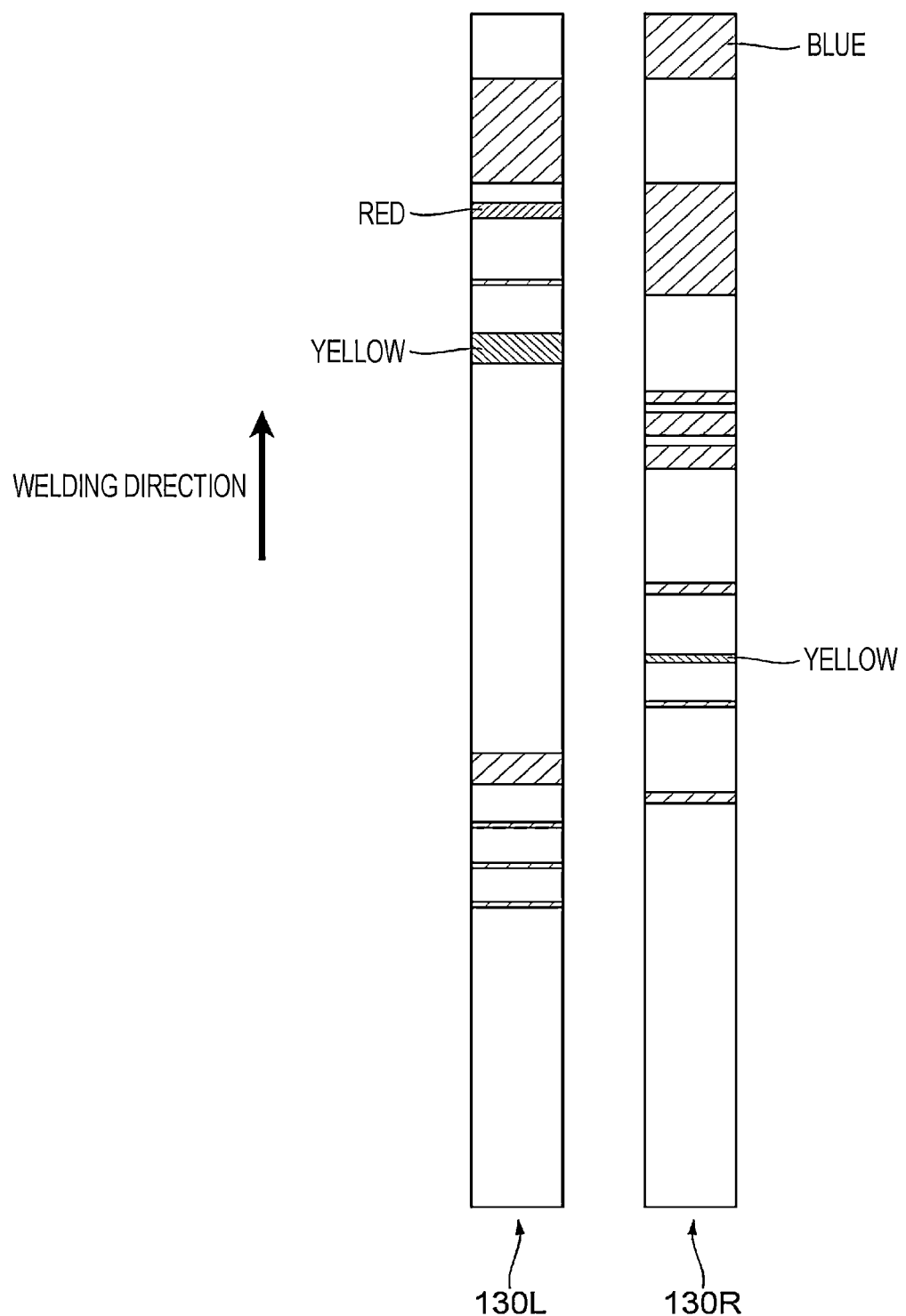
FIG. 12 is an explanatory view representing an example of a screen on which determination results of a determination unit are displayed in correspondence to a left edge and a right edge of the root gap.

FIG. 12 is an explanatory view representing an example of a screen on which determination results of the determination unit 205 are displayed in correspondence to a left edge and a right edge of the root gap.

In FIG. 12, a band-shaped display field 130L positioned on the left side indicates the determination result corresponding to the left edge of the root gap, and a band-shaped display field 130R positioned on the right side indicates the determination result corresponding to the right edge of the root gap.

In the case of FIG. 12, a segment is displayed at the time of outputting of the determination result, and a period during which the determination result is not output is displayed in blank.

In this embodiment, suitability of the determination result is indicated in different colors of the segments. For example, blue is used when it is determined that the satisfactory penetration bead is formed. This case corresponds to the state in which the tip point and the edge line of the root gap satisfy the relation illustrated in FIG. 5A.

Furthermore, red is used when it is determined that the formed penetration bead is unsatisfactory. This case corresponds to the state in which the tip point and the edge line of the root gap satisfy the relation illustrated in FIG. 5B or 5D.

Yellow is used when it is determined that whether the penetration bead is satisfactory or not is unclear. This case corresponds to the state in which the tip point and the edge line of the root gap satisfy the relation illustrated in FIG. 5C.

In the case of FIG. 12, the latest determination result is displayed at the top in each of the display fields 130L and 130R. Accordingly, the bottom in each of the display fields 130L and 130R corresponds to information that has been obtained at the oldest point in time among the displayed determination results.

Other Embodiments

The embodiment of the present invention has been described above, but the technical scope of the present invention is not limited to the above embodiment. It is apparent from the description in Claims that various modifications or improvements of the above embodiment also fall within the technical scope of the present invention. For example, a learning result of a learning device may be reflected on the processes of extracting the feature variables, determining the suitability of the formed penetration bead, and computing the correction amount of the welding condition.

Figure 13:
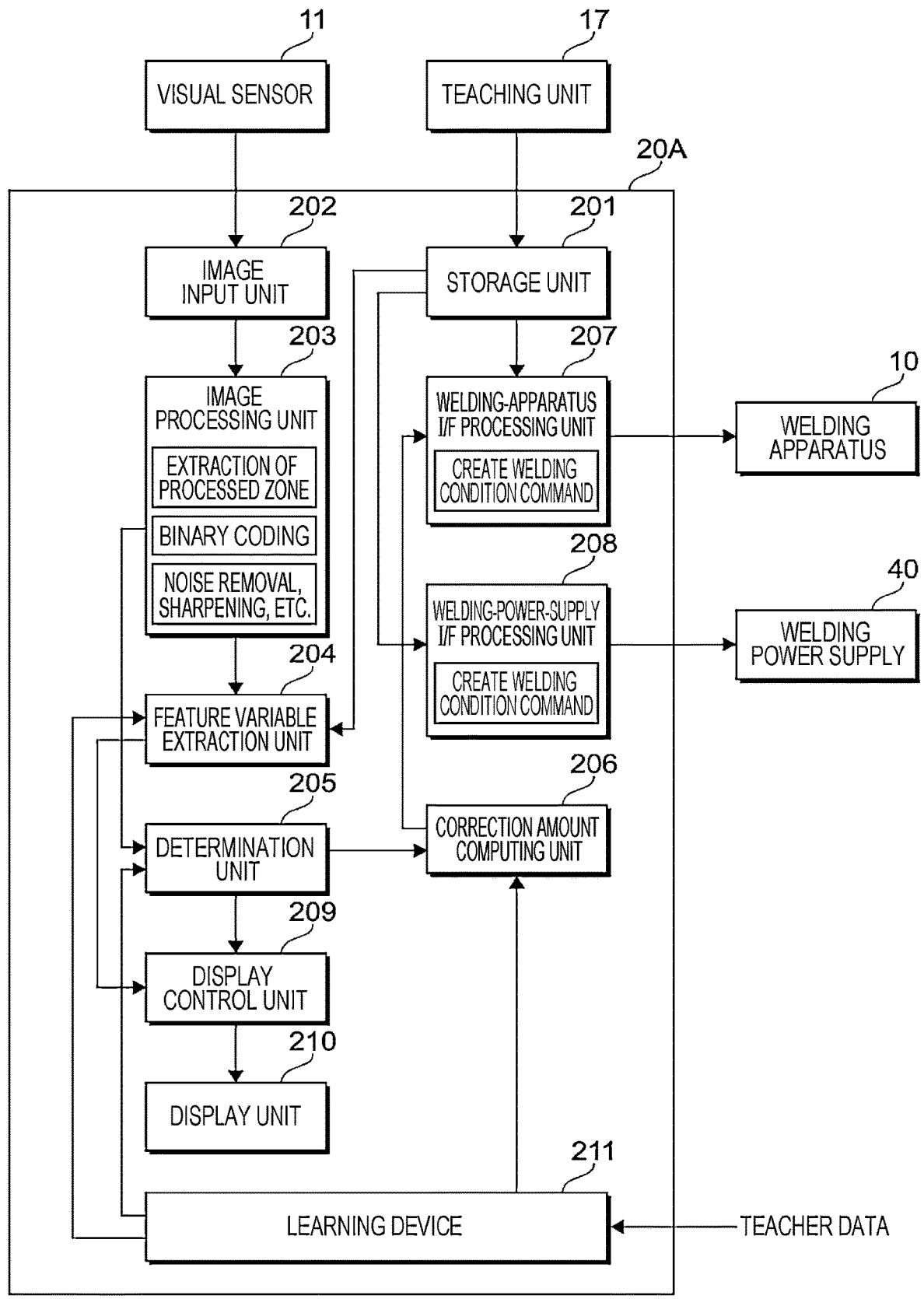
FIG. 13 is an explanatory view representing an example of configuration of a welding control device that includes a learning device.

FIG. 13 is an explanatory view representing an example of configuration of a welding control device 20A that includes a learning device 211. Components in FIG. 13 are denoted by the same reference sings as those used in FIG. 3 to denote the corresponding components.

The welding control device 20A illustrated in FIG. 13 is different from the welding control device 20 illustrated in FIG. 3 in that teacher data is given to the learning device 211 and that a created learning model is given to the feature variable extraction unit 204, the determination unit 205, and the correction amount computing unit 206.

In the case of FIG. 13, the feature variable extraction unit 204 applies a learning model, which has been created by using, for example, a recurrent deep neutral network (DNN), to the image 100 captured by the visual sensor 11, and extracts the coordinates (X1, Y1) giving the tip point of the molten pool and the linear function giving the edge line of the root gap. The learning model herein is an example of a first model and a second model.

More specifically, the feature variable extraction unit 204 decides values of X1 and Y1 giving the coordinates and values of the gradient a and the intercept b of the linear function that is expressed by Eq. 1.

In order to create the learning model, appropriate teacher data needs to be given to the learning device 211 in advance. First, multiple sets of relations among the coordinate values X1 and Y1, the gradient a, and the intercept b are prepared as the teacher data, those multiple sets of relations being obtained for data of the images captured when the to-be-welded materials are welded under a wide variety of welding conditions.

The learning device 211 having been given with the teacher data designs a recurrent DNN that outputs the coordinate values X1 and Y1, the gradient a, and the intercept b for the data of the images captured when the to-be-welded materials are welded under the wide variety of welding conditions. Then, the learning device 211 creates a learning model with the recurrent DNN by further learning various input image data. The created learning model is given to the feature variable extraction unit 204.

Figure 14:
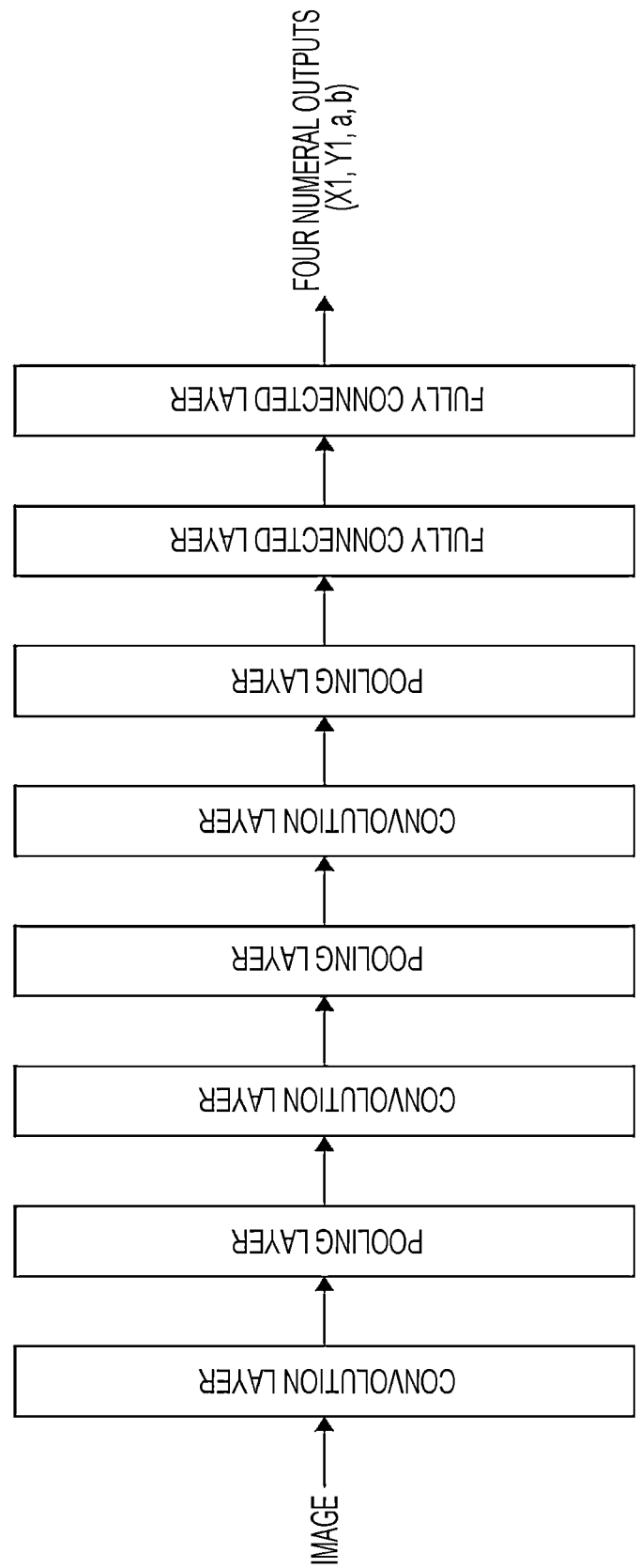
FIG. 14 is an explanatory view representing processing steps, executed by the feature variable extraction unit, from a step of applying the image input from the visual sensor to a learning model to a step of extracting the feature variables.

FIG. 14 is an explanatory view representing processing steps, executed by the feature variable extraction unit 204, from a step of applying the image input from the visual sensor 11 to the learning model to a step of extracting the feature variables.

As illustrated in FIG. 14, the feature variable extraction unit 204 computes the number of matches of features over the entirety of the image 100, and repeatedly executes a convolution layer in which feature portions of the image are extracted and a pooling layer in which noise processing is performed to emphasize the extracted feature portions. After finally executing a fully connected layer in which processing results are connected, the feature variable extraction unit 204 outputs the coordinate values X1 and Y1, the gradient a, and the intercept b.

Return to the explanation of FIG. 13.

Also in each of the determination unit 205 and the correction amount computing unit 206, a learning model created by using the recurrent DNN, for example, may be applied to the input data, thus causing the determination unit 205 and the correction amount computing unit 206 to output respectively the determination results and the correction amounts with respect to the extracted feature variables.

In application to the determination in the determination unit 205 and the computation in the correction amount computing unit 206, teacher data just needs to be prepared in similar procedures to those in the above-described case of the feature variable extraction unit 204. In other words, it is just needed to prepare, as the teacher data, multiple sets of relations of output values relative to input data, for example, image data obtained when the to-be-welded materials are welded under a wide variety of welding conditions.

Here, four types of outputs p1 to p4, for example, are used as outputs of learning data that is used in the determination unit 205 to perform the determination.

The output p1 represents a state corresponding to FIG. 5A in which the satisfactory penetration bead is formed, namely a "molten state".

The output p2 represents a state corresponding to FIG. 5C in which whether the satisfactory penetration bead is formed or not is unclear, namely a state in which "whether the materials are molten or not cannot be determined".

The output p3 represents a state corresponding to FIGS. 5B and 5D in which the unsatisfactory penetration bead is formed, namely a "non-molten state".

The output p4 represents a state in which the positional relation cannot be determined due to interference of the wire and so on reflected in the image 100. Thus, p4 corresponds to the blank period in FIG. 12.

The learning device 211 having been given with the teacher data designs a recurrent DNN that outputs the four types of outputs p1 to p4 for the data of the images captured under a wide variety of welding conditions. Then, the learning device 211 creates a learning model with the recurrent DNN by further learning various input image data. The created learning model is given to the determination unit 205.

FIG. 15 is an explanatory view representing processing steps, executed by the determination unit 205, from a step of applying the image input from the visual sensor 11 to the learning model to a step of outputting any one of the four types of determination results.

As illustrated in FIG. 15, the determination unit 205 computes the number of matches of features over the entirety of the image 100, and repeatedly executes a convolution layer in which feature portions of the image are extracted and a pooling layer in which noise processing is performed to emphasize the extracted feature portions. After finally executing a fully connected layer in which processing results are connected, the determination unit 205 outputs any one of p1 to p4.

In the case of causing the correction amount computing unit 206 to output the correction amount in a similar manner, the correction amount computing unit 206 just needs to be designed to output the correction amount in accordance with the relations between the four types of outputs p1 to p4 and the predetermined welding conditions.

In such a case, the "non-molten" state may be further classified into a "slightly non-molten" state and a "totally non-molten" state, and the correction amount may be output depending on each of those classified states.

For example, when the determination result is classified into the "slightly non-molten" state, the correction amount may be set to output a value with which the welding speed is decreased by 5 cm/min.

For example, when the determination result is classified into the "totally non-molten" state, the correction amount may be set to output a value with which the welding speed is decreased by 10 cm/min.

While DNN is utilized to create the learning model in the above embodiment, the present invention is of course not limited to the case of utilizing DNN to create the learning model.

While the above description has been made in connection with the example in which the edge line of the root gap is extracted as the feature variable through the image processing and the example in which the edge line is extracted by using the learning model, measurement may be performed while the welding is continued. In such a case, it is just needed, for example, to dispose, on the carriage 30, a sensor for measuring the position of the edge line of the root gap on the front side in the welding direction relative to the welding region, and to give measured values sequentially output from the sensor with the progress of the welding, as the left edge line 111L and the right edge line 111R, to the determination unit 205. For example, the sensor may be attached to any desired position on the carriage 30 insofar as the position is located on the front side in the welding direction relative to the welding region and the root gap can be measured at that position. The sensor is an example of the second detection means.

In the above case, the feature variable extraction unit 204 is just needed to extract only the left end point 112L and the right end point 112R, namely the tip ends of the molten pool, from the image 100 and to give the extracted end points to the determination unit 205. The feature variable extraction unit 204 used herein functions only as the first detection means. In that case, the learning model created by the learning device 211 (see FIG. 13) may also be applied to the feature variable extraction unit 204 and so on. The learning model used herein is an example of the first model.

Although the various embodiments have been described above with reference to the drawings, the present invention is, as a matter of course, not limited to those embodiments. It is to be understood that those skilled in the art can apparently conceive various examples of modifications and improvements within the scope defined in Claims, and that those examples also fall within the technical scope of the present invention. In addition, constituent elements in the above embodiments can be optionally combined with each other without departing from the gist of the invention.

This application is based on Japanese Patent Application (No. 2018-154606) filed Aug. 21, 2018, which is incorporated herein by reference in its entirety.

REFERENCE SIGNS LIST

1 . . . welding system, 10 . . . welding apparatus, 11 . . . visual sensor, 12 . . . welding torch, 13 . . . filler wire, 14 . . . conduit cable, 15 . . . 2-axis slider, 16 . . . arc, 17 . . . teaching unit, 20, 20A . . . welding control device, 30 . . . carriage, 31 . . . rail, 40 . . . welding power supply, 50, 50L, 50R . . . to-be-welded material, 101 . . . fusion zone, 102 . . . non-fusion zone, 111L . . . left edge line, 111R . . . right edge line, 112L . . . left end point, 112R . . . right end point, 120L, 120R . . . processed region, 204 . . . feature variable extraction unit, 205 . . . determination unit, 206 . . . correction amount computing unit, 209 . . . display control unit

The invention claimed is:

1. A welding control device for controlling a welding condition when arc welding is performed on a groove having a root gap, the welding control device comprising:
    a first detector that detects, from a captured image of a fusion zone formed in the groove, a position of a tip of the fusion zone with respect to a direction in which the arc welding progresses;
    a second detector;
    determination means that determines a relation between the position of the end and the position of the tip of the fusion zone; and
    a controller that controls the welding condition in accordance with a determination result of the determination means,
    wherein the controller decides a correction amount of the welding condition in accordance with both or either one of:
    with respect to a width direction of the groove perpendicular to both the direction in which the arc welding progresses and a thickness direction of the to-be-welded object in a surface of the to-be-welded object, a distance between the end of the to-be-welded object positioned on one side and the tip of the fusion zone positioned on the one side, and
    a distance between the end of the to-be-welded object positioned on the other side opposite to the one side and the tip of the fusion zone positioned on the other side.

2. The welding control device according to claim 1, wherein the second detector detects, from the captured image of the fusion zone, the position of the end of the to-be-welded object, the end defining the root gap.

3. The welding control device according to claim 2, wherein the position of the tip of the fusion zone and the position of the end of the to-be-welded object, the end defining the root gap, are given based on a reference point that is set on the image in advance.

4. The welding control device according to claim 1, wherein the welding condition is one or more among a welding current, an arc voltage, a welding speed, a wire feed speed, an electrode position, a wire insertion position, and a weaving condition.

5. The welding control device according to claim 1, wherein the determination means determines:
    with respect to a width direction of the groove perpendicular to both the direction in which the arc welding progresses and a thickness direction of the to-be-welded object in a surface of the to-be-welded object, both or either one of a positional relation between the end of the to-be-welded object positioned on one side and the tip of the fusion zone positioned on the one side, and
    a positional relation between the end of the to-be-welded object positioned on the other side opposite to the one side and the tip of the fusion zone positioned on the other side.

6. The welding control device according to claim 5, wherein the determination means determines both or either one of:
    that, with respect to the width direction of the groove, the tip of the fusion zone positioned on the one side is located within a vicinity range relative to the end of the to-be-welded object positioned on the one side, or located away beyond the vicinity range toward the one side, or located away beyond the vicinity range toward the other side, and that, with respect to the width direction of the groove, the tip of the fusion zone positioned on the other side is located within a vicinity range relative to the end of the to-be-welded object positioned on the other side, or located away beyond the vicinity range toward the other side, or located away beyond the vicinity range toward the one side.

7. The welding control device according to claim 1, wherein the controller controls the welding condition based on a model that has been prepared through learning of a relation between the determination result and the welding condition.

8. The welding control device according to claim 1, wherein the first detector detects, based on a first model that has been prepared through learning of a relation between the captured image of the fusion zone and the position of the tip of the fusion zone, the position of the tip from the captured image that is newly given, and the second detector detects, based on a second model that has been prepared through learning of a relation between the captured image and the position of the end of the to-be-welded object, the end defining the root gap, the position of the end from the captured image that is newly given.

9. The welding control device according to claim 1, wherein an amount of transmitted light per unit time or a wavelength band in capturing the image of the fusion zone is changed depending on a welding current.

10. The welding control device according to claim 1, further comprising display control means that displays, in a superimposed relation to the captured image of the fusion zone, a symbol indicating a position at which the tip of the fusion zone has been detected and a straight line indicating a position at which the end defining the root gap has been detected.

11. The welding control device according to claim 10, wherein the symbol is displayed at the detected position each time the tip of the fusion zone is newly detected.

12. The welding control device according to claim 1, further comprising a display that displays a result of evaluating, based on a predetermined reference, the relation between the position of the end and the position of the tip of the fusion zone on a time series basis in correspondence to the end.

13. A welding system comprising a welding apparatus that performs arc welding on a to-be-welded object, a visual sensor mounted at a position at which the visual sensor is able to capture an image of a fusion zone formed in a groove having a root gap, and a welding controller that controls a welding condition specifying a motion of the welding apparatus, wherein the welding controller comprises:

a first detector that detects, from the image captured by the visual sensor, a position of a tip of the fusion zone with respect to a direction in which the arc welding progresses;

a second detector that detects a position of an end of the to-be-welded object, the end defining the root gap;

determination means that determines a relation between the position of the end and the position of the tip of the fusion zone; and a controller that controls the welding condition in accordance with a determination result of the determination means, wherein the controller decides a correction amount of the welding condition in accordance with both or either one of:

with respect to a width direction of the groove perpendicular to both the direction in which the arc welding progresses and a thickness direction of the to-be-welded object in a surface of the to-be-welded object, a distance between the end of the to-be-welded object positioned on one side and the tip of the fusion zone positioned on the one side, and a distance between the end of the to-be-welded object positioned on the other side opposite to the one side and the tip of the fusion zone positioned on the other side.

14. A welding control method for controlling a welding condition when arc welding is performed on a groove having a root gap, the welding control method comprising steps of:

detecting, from a captured image of a fusion zone formed in the groove, a position of a tip of the fusion zone with respect to a direction in which the arc welding progresses;

detecting a position of an end of a to-be-welded object, the end defining the root gap:

determining a relation between the position of the end and the position of the tip of the fusion zone; and controlling the welding condition in accordance with a determination result, and with a correction amount of the welding condition in accordance with both or either one of:

with respect to a width direction of the groove perpendicular to both the direction in which the arc welding progresses and a thickness direction of the to-be-welded object in a surface of the to-be-welded object, a distance between the end of the to-be-welded object positioned on one side and the tip of the fusion zone positioned on the one side, and a distance between the end of the to-be-welded object positioned on the other side opposite to the one side and the tip of the fusion zone positioned on the other side.

15. A program used in a welding control device for controlling a welding condition when arc welding is performed on a groove having a root gap, the program being stored in a non-transitory computer readable medium and causing the welding control device to implement functions of:

detecting, from a captured image of a fusion zone formed in the groove, a position of a tip of the fusion zone with respect to a direction in which the arc welding progresses;

detecting a position of an end of a to-be-welded object, the end defining the root gap;

determining a relation between the position of the end and the position of the tip of the fusion zone; and controlling the welding condition in accordance with a determination result, and with a correction amount of the welding condition in accordance with both or either one of:

with respect to a width direction of the groove perpendicular to both the direction in which the arc welding progresses and a thickness direction of the to-be-welded object in a surface of the to-be-welded object, a distance between the end of the to-be-welded object positioned on one side and the tip of the fusion zone positioned on the one side, and a distance between the end of the to-be-welded object positioned on the other side opposite to the one side and the tip of the fusion zone positioned on the other side.

* * * * *